United States Patent
Beresnev

(10) Patent No.: US 9,223,091 B2
(45) Date of Patent: Dec. 29, 2015

(54) LIGHT BEAM COLLIMATOR PARTICULARLY SUITABLE FOR A DENSELY PACKED ARRAY

(71) Applicant: U.S. Army Research Laboratory ATTN: RDRL-LOC-I, Adelphi, MD (US)

(72) Inventor: Leonid A. Beresnev, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 233 days.

(21) Appl. No.: 13/780,112

(22) Filed: Feb. 28, 2013

(65) Prior Publication Data

US 2014/0241665 A1    Aug. 28, 2014

(51) Int. Cl.
G02B 6/32    (2006.01)
G02B 27/30    (2006.01)

(52) U.S. Cl.
CPC . *G02B 6/32* (2013.01); *G02B 27/30* (2013.01)

(58) Field of Classification Search
CPC .................................................... G02B 6/4226
See application file for complete search history.

(56) References Cited

U.S. PATENT DOCUMENTS 5,660,748 A * 8/1997 Tanaka et al. ............. 219/121.84
6,174,102 B1 * 1/2001 Do et al. ........................ 403/381

FOREIGN PATENT DOCUMENTS

JP        62258412 A * 11/1987 ............... G02B 7/00

* cited by examiner

*Primary Examiner* — Uyen Chau N Le
*Assistant Examiner* — Chris Chu
(74) *Attorney, Agent, or Firm* — Alan I. Kalb

(57) ABSTRACT

A method and apparatus for controlled displacement, rotation and deformation of parts of a fiber optic collimator so as to provide multiple degrees of adjustment freedom that are decoupled one from another, for adjusting the path of a light beam, comprising: an output elongate hollow node for passing a light beam therethrough and towards a lens, and an elongate hollow base node having separate top and bottom parts connected to each other by opposed ends of a plurality of flexible rods that restrict the relative movement between the top and bottom parts of the base node to substantially only translational parallel movement. Opposed portions of the top and bottom parts of the base node each include a respective screw and an opposed slanted surface, which upon interaction, develop a shearing force which is applied to the top and bottom parts of the base node and cause a translational parallel relative movement therebetween.

9 Claims, 27 Drawing Sheets

POLARIZATION
PLANE

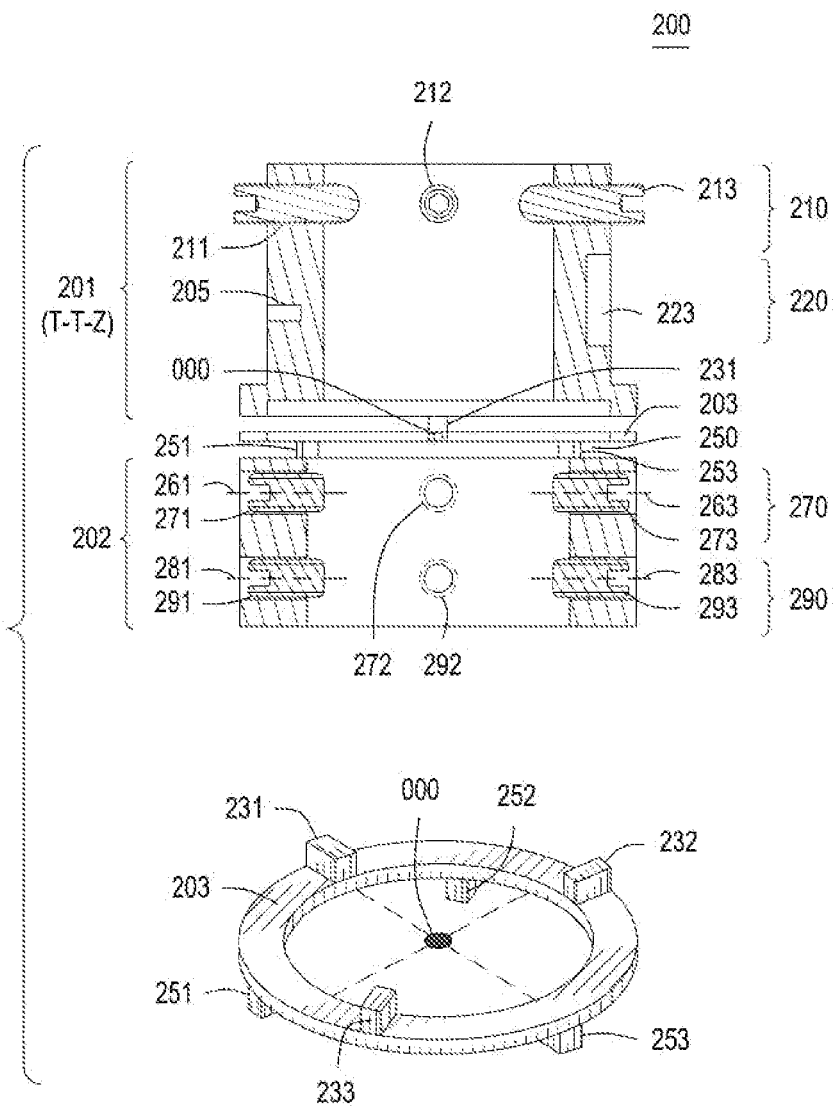

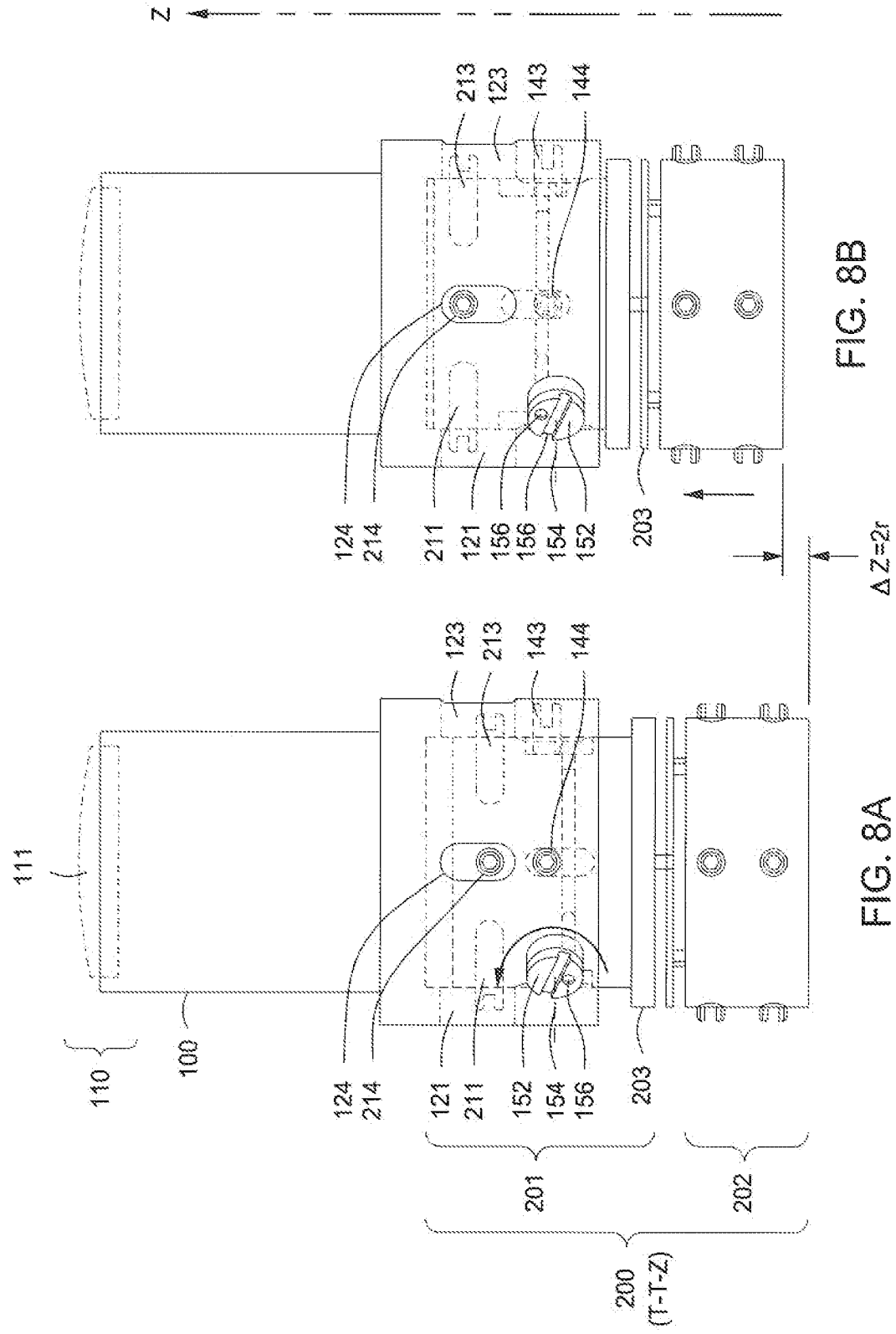

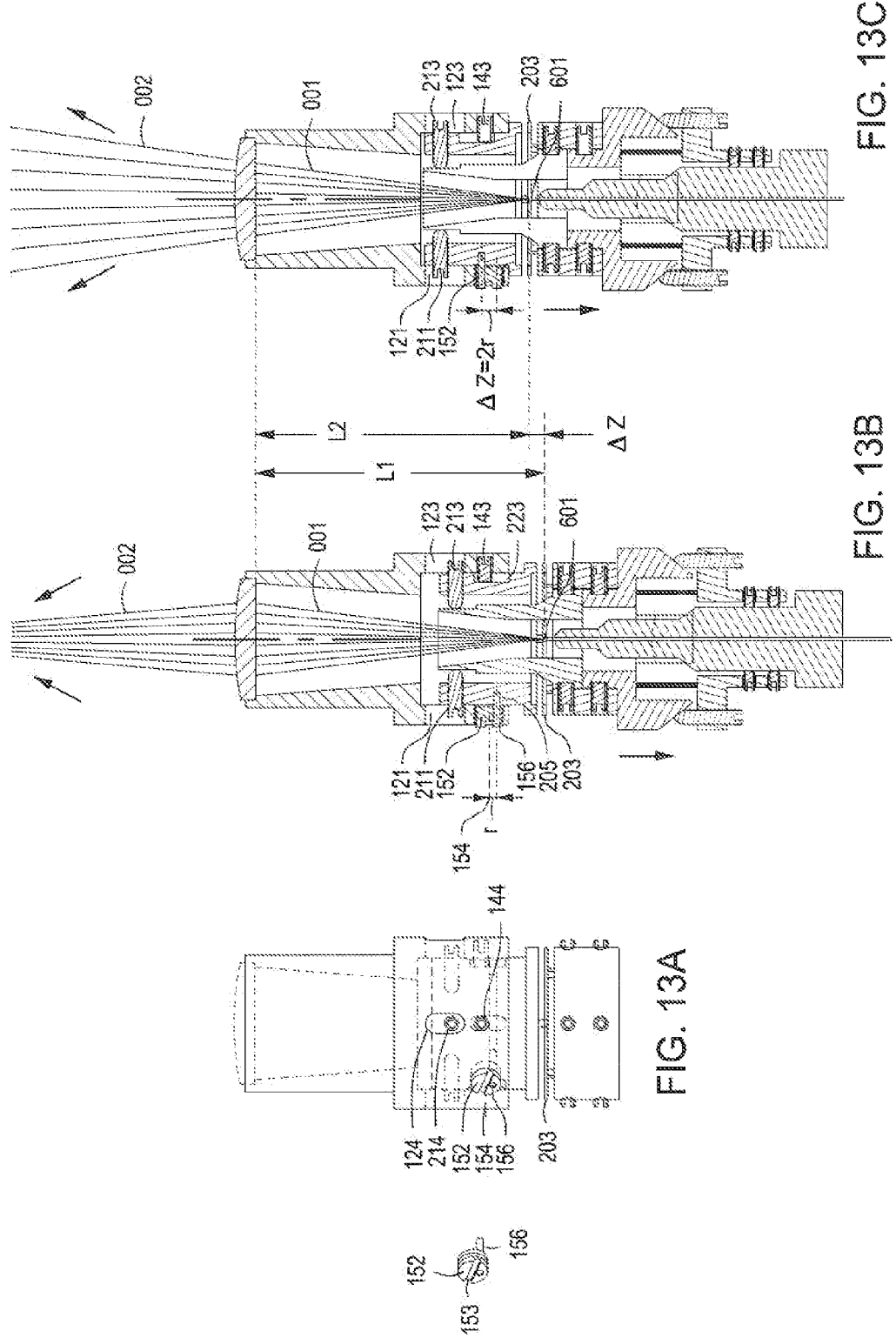

LIGHT BEAM COLLIMATOR PARTICULARLY SUITABLE FOR A DENSELY PACKED ARRAY

GOVERNMENT INTEREST

Governmental Interest—The invention described herein may be manufactured, used and licensed by or for the U.S. Government.

FIELD OF INVENTION

Embodiments of the present invention generally relate to a light beam collimator and more particularly, to a method and apparatus for adjustably positioning an optical fiber therein that supplies a light beam, where sequentially coupled mechanical portions of the collimator provide axial alignment adjustability of the light beam within the collimator in a manner such that the adjustments are substantially decoupled one from another, and where the collimator is particularly suitable for mounting in a densely packed array. Suitability of the collimator for mounting in a densely packed array is provided by having simple rotation mechanisms for complete control of the alignment adjustability, which rotation mechanisms are all accessible at the perimeter of the collimator.

BACKGROUND OF THE INVENTION

An optical fiber is typically used to transmit coherent monochromatic light, which is emitted from an output end of the optical fiber, hereinafter called the emitting tip. Such optical fibers typically have an active core diameter of about 6-20 microns, in the case of a single-mode fiber. A fiber optic collimator is a common optical node found in many places in the modern fiber optic industry. The collimator is a device which holds in an adjustable manner the emitting tip of the optical fiber so that it is positionable in multiple axes near the focus of a lens, so as to provide at the output of the lens (collimator) a parallel (collimated) laser beam. Such positionability is typically expressed as an adjustability with multiple degrees of freedom, such as plus and minus translation ($\Delta$) in X, Y and Z linear axes, Rotation ($\Omega$) about the longitudinal axis of the collimator and Tilt of the emitting tip of the optical fiber (hereinafter called Tip-Tilt), leading to a requirement of having multiple degrees of freedom (preferably nine), each degree of freedom decoupled from the other, for establishing a precise alignment of multiple collimators in an array.

FIG. 1 illustrates a schematic view of a typical fiber optic collimator. A fiber-optic cable 600 has an emitting tip 601 that is to be positioned at a lens focus point 000. The light beam exiting emitting tip 601 is a divergent beam 001, that is, the light beam diverges the farther away it travels from the emitting tip 601. A lens 111 is positioned at a distance F (focal length) from the emitting tip 601 so as to provide at the output of the lens a collimated light beam 002.

The position of the emitting tip 601 relative to the lens focus point 000 strongly influences the beam parameters. For example, a negative displacement of the tip along the longitudinal axis of the collimator leads to convergence (focusing) of the beam as shown by the arrows adjacent beam 002 in FIG. 2A, while a positive displacement of the tip along the longitudinal axis of the collimator leads to divergence (de-focusing) of the beam, as shown by the arrows adjacent beam 002 in FIG. 2B.

A tilt of the fiber-optic cable 600, noted above called a Tip-Tilt (or an equivalent effect caused by deviation of beam propagation relative to an angled cleaving of the emitting tip 601), leads to a perpendicular displacement delta ($\Delta$) of the beam centroid from the optical center of lens 111, as shown by the arrow adjacent beam 002 in FIG. 4. The effect of such displacement is that the maximum intensity of Gaussian-shaped divergent beam 001 no longer coincides with the center of lens 111, thereby decreasing the fill factor and quality of the collimated laser beam 002.

A lateral shift of the emitting tip 601 relative to the focal plane of lens 111 by an amount delta ($\Delta$)Y as shown in FIG. 5, induces an angular deviation of the output beam 002, which can easily result in missing a target or receiver area that is located at a remote distance from lens 111.

FIG. 5 illustrates another parameter that requires adjustment, namely the polarization angle Omega ($\Omega$) of each collimated beam 002, which should be adjustable so as to match the polarization angle Omega of each other beam in an array of collimators. Thus, the fiber optic 600 should be angularly adjustable about the Z axis of the collimator so as to adjust beam polarization.

From the above, it should be clear that the ability of precisely control adjustment of the position of the emitting tip in the collimator is an essential requirement for a collimator, For example, at an aperture lens diameter of 30 mm and a focal length of 150 mm, a diffraction limited target (~3 cm) at a distance of 1000 m will be totally missed if the emitting tip 601 in the collimator is displaced by only 5 microns from the focus 000 of the lens.

Numerous mechanical controlling stages (like X-Y-Z or tip-tilt-rotation nodes) have been developed in the fiber optic industry to provide precision control of the position and orientation of a fiber node that supports therein the fiber emitting tip. Such mechanical devices are typically supplied with micrometers as well as with stepping motors and servo motors so as to allow precise manual or computerized alignment of the node that holds the fiber optic emitting tip and other parameters of the collimator, for alignment in the X, Y and Z directions of the tip, as well as its rotational position, relative to the lens focal point in the controlling stage. Computerized alignment is particularly important in view of the fact that existing fiber optic controlling stages typically require iterative adjustment, since adjustment along one axis typically affects to some degree alignment in another axes, that is such adjustments heretofore have not been decoupled one from the other.

Thus, existing alignment controlling stages are bulky and require a lot of space to provide the necessary stiffness and accuracy to enable such precise control, and, as rioted above, have adjustments that are somewhat "coupled" one to the other in that adjustment of one alignment stage disadvantageously affects the alignment of another stage. Thus, in combination with the controlling stages, the physical space taken up by a collimator extends substantially beyond the perimeter required for transmitting just the light beam. Advanced optical systems, such as systems requiring more power, however, may require more than use of a single fiber optic collimator, and therefore an array of collimators mounted so as to be in close proximity and parallel to each other is also highly desirable. For example, FIG. 6 illustrates coherent laser beam combining in a sparse aperture array design that requires dense packing within a mount of a plurality of collimators, such as the seven fiber optic collimators shown. Arrays having even more fiber optic collimators would be desirable.

However, the density of packing is among the most difficult requirements to meet for achieving the highest optical performance in a fiber optic collimator array, The array may have standard fiber optic ferrules with static positioning of the fiber outputs, or may have fast responding fiber positioners with high frequency bandwidth, providing computer controlled compensation of deviations of separate beams from the target induced with vibrations or/and optical turbulences in a propagation media (e.g., atmosphere).

The physical closeness of the collimators to each other in a densely packed array of collimators makes alignment of the separate fiber outputs in a common mount a complicated task. This is due to the spatial requirement of the need for sufficient access to a means used for adjustment of the alignment provided by each of the collimators. Moreover, after an optimum alignment of each collimator in the array is found, the alignment should hold, that is, be very stable under changing environmental conditions, such as vibration, temperature, etc.

One known design for a fiber collimator comprising alignment controlling stages is shown by my prior publication "Development of Adaptive Fiber Collimators for Conformal Fiber-Based Beam Projection Systems", published in the Proceedings of SPIE, Vol. 7090, 709008 (2008), incorporated herein by reference. The mechanical design of the collimator comprises four cylindrical shaped, concentric elements or alignment nodes. Although that design functioned according to specifications to provide the necessary controls of alignment, alignment was somewhat cumbersome because adjustment of alignment in one or more of the axes via one node was not decoupled from affecting alignment in one or more of any of the other axes in another node.

Alignments needed are:

Course adjustment of tip 601 along the optical axis Z for alignment with respect to the point 000 in the collimator. FIGS. 2A and 2B illustrate the focusing and defocusing alignment effect, respectively, of the output beam, as a result of tip displacement along the optical axis.

Course adjustment of tip 601 along the optical X and Y axes for alignment with respect to the point 000 in the collimator. FIG. 4 illustrates the effect on beam alignment resulting from a lateral shift (X-Y) of the output beam.

Rotation of the fiber 600 around its longitudinal axis. FIG. 5 illustrates the effect of rotation of fiber optic 600 by an angle Omega ($\Omega$) and a corresponding rotation of its polarization plane 010, so that should the collimator be part of collimator array, the light beam of each collimator of the array can be adjusted to have the same polarization.

Corrections for deviations (tip-tilt) of the fiber 600 relative to the point 000. FIG. 3 illustrates the effect of tilt-tip deviation of the optical fiber 600, thereby establishing a need for x and y axis alignment of the tip 601 with respect to the point 000 during a tip-tilt condition.

And finally, precise control of the displacement of the tip 601 in the X and Y axis with respect to the focal plane of lens 111. FIG. 4 illustrates the effect of displacement in the Y axis direction.

Therefore, there is a need in the art for a method and apparatus for providing a fiber optics collimator having multiple, up to nine, degrees of freedom to adjust its alignment in a decoupled manner and which is suitable for mounting in a densely packed array. Suitability for mounting in a densely packed array is judged by a reduction in the spatial requirements of the means for adjusting the collimator, thereby allowing dense packing and access to the alignment adjustments.

BRIEF SUMMARY OF THE INVENTION

A method and apparatus for a fiber optic collimator as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Embodiments of the present invention also relate to an apparatus for providing a fiber optic collimator having multiple degrees of freedom in order to adjust its alignment and which is suitable for mounting in a densely packed array.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7B is cross-section view of a Tip-Tilt-Z node portion of the collimator of FIG. 7, constructed in accordance with an exemplary embodiment of the present invention;

FIGS. 8A and 8B illustrate assembly of the barrel node to the Tip-Tilt-Z-node, as illustrated in FIG. 7A, and the effect of Z-axis deviation between these nodes;

FIGS. 11B and 11C show details for preliminary alignment of the fiber tip near the rotation point for tip tilt deviations, in accordance with the exemplary embodiment of the invention shown in FIG. 7A;

FIG. 13A illustrates details of the assembly of the lower portion of the barrel node connection to the upper portion of the Tip-Tilt-Z node, as illustrated in FIG. 7A, and FIGS. 13B and 13C illustrate details of the interaction of the lower portion of the barrel node with the upper portion of the Tip-Tilt-Z node for aligning the fiber tip so as to control the focus and defocus of the beam, in accordance with the exemplary embodiment of the invention shown in FIG. 7A;

DETAILED DESCRIPTION OF THE INVENTION

Embodiments of the present invention comprise a method and apparatus for providing a fiber optics collimator having multiple, such as nine, degrees of freedom substantially decoupled one from the other and which is suitable for mounting in a densely packed array. The embodiments of the present invention provide a collimator which enables control and locking of all parameters of the collimated light beam emitted from the tip of the fiber. The present embodiments allow one to construct an array of fiber collimators without restriction of the amount of collimators which can be used, and permits alignment of light emitting fiber tips having either of orthogonal or angled cleaving. Adjustment of all degrees of freedom use standard screws as controlling elements without the requirement to use bulky micrometers or motors. Easy access to the controlling screws at the perimeter of each collimator allows one to align the array of collimators using common screwdrivers. Once a final adjustment of all degrees of freedom is set, the adjustment can be locked using the same screws, thereby providing long-term stability of the alignment of the array of collimators as set by the final adjustment.

It is noted that in the following Figures and corresponding description, X and Y adjustments are provided in some embodiments by two pairs of orthogonally positioned screws (and/or their threaded holes and/or access slots), in some embodiments by two pairs of flexible rods and in other embodiments by two pairs of slanted surfaces, where the position of each screw, rod or slanted surface of each pair is adjustable in one of the X and Y axial directions. It is to be understood that for completeness sake, although in the following description reference will often be made to both pairs of these screws, rods and slanted surfaces, in the corresponding Figures, due to the orthogonal nature of the position of the screws, rods and surfaces, not all of the screws, rods and slanted surfaces will be visible in each Figure or visible at all.

Figure 7A:
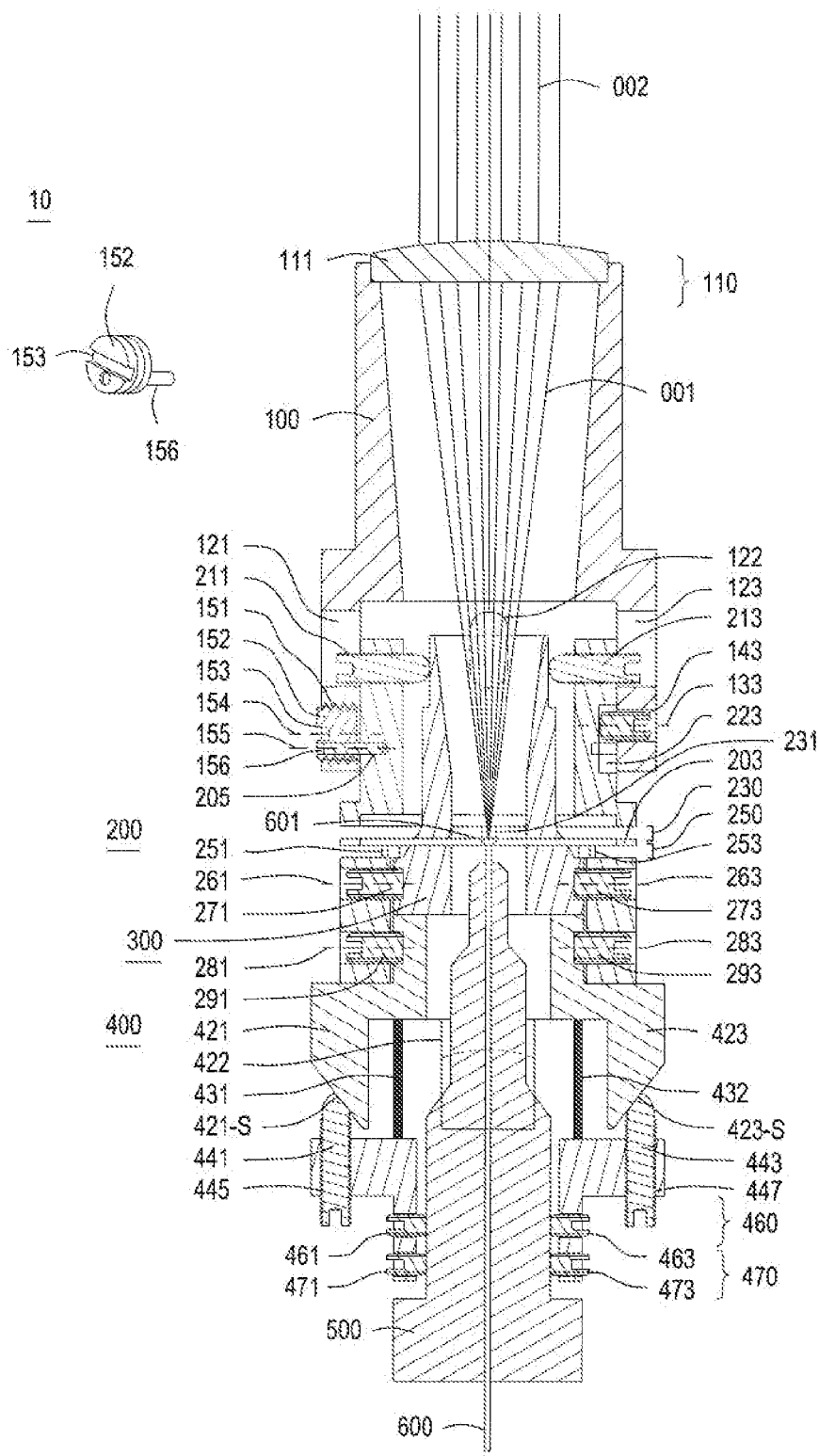
FIG. 7A is a cross-section view of an assembled collimator constructed in accordance with an exemplary embodiment of the present invention.
Figure 7C:
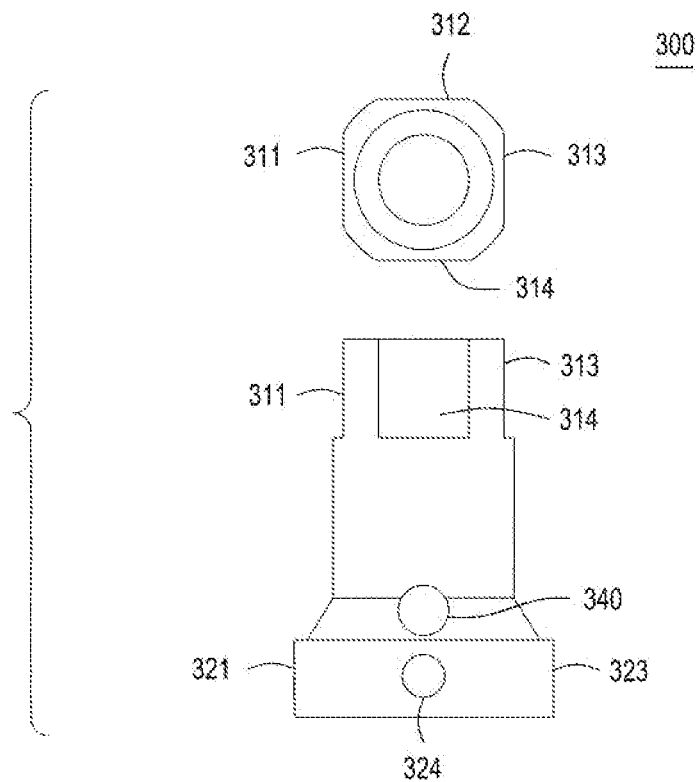
FIG. 7C is cross-section view of a Lever node portion of the collimator of FIG. 7A, constructed in accordance with an exemplary embodiment of the present invention.
Figure 7D:
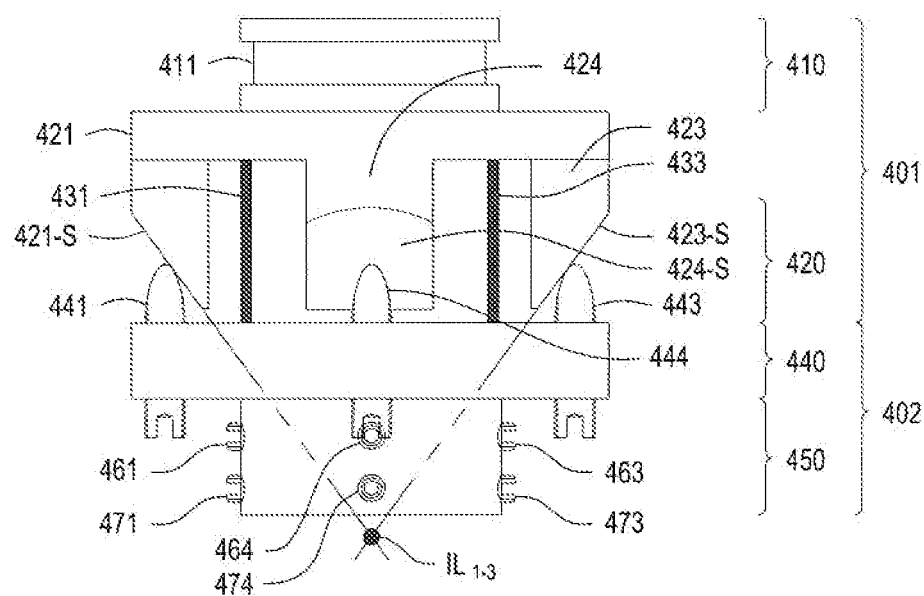
FIG. 7D is cross-section view of an X-Y-$\Omega$ node portion of the collimator of FIG. 7A, constructed in accordance with an exemplary embodiment of the present invention
Figure 19A:
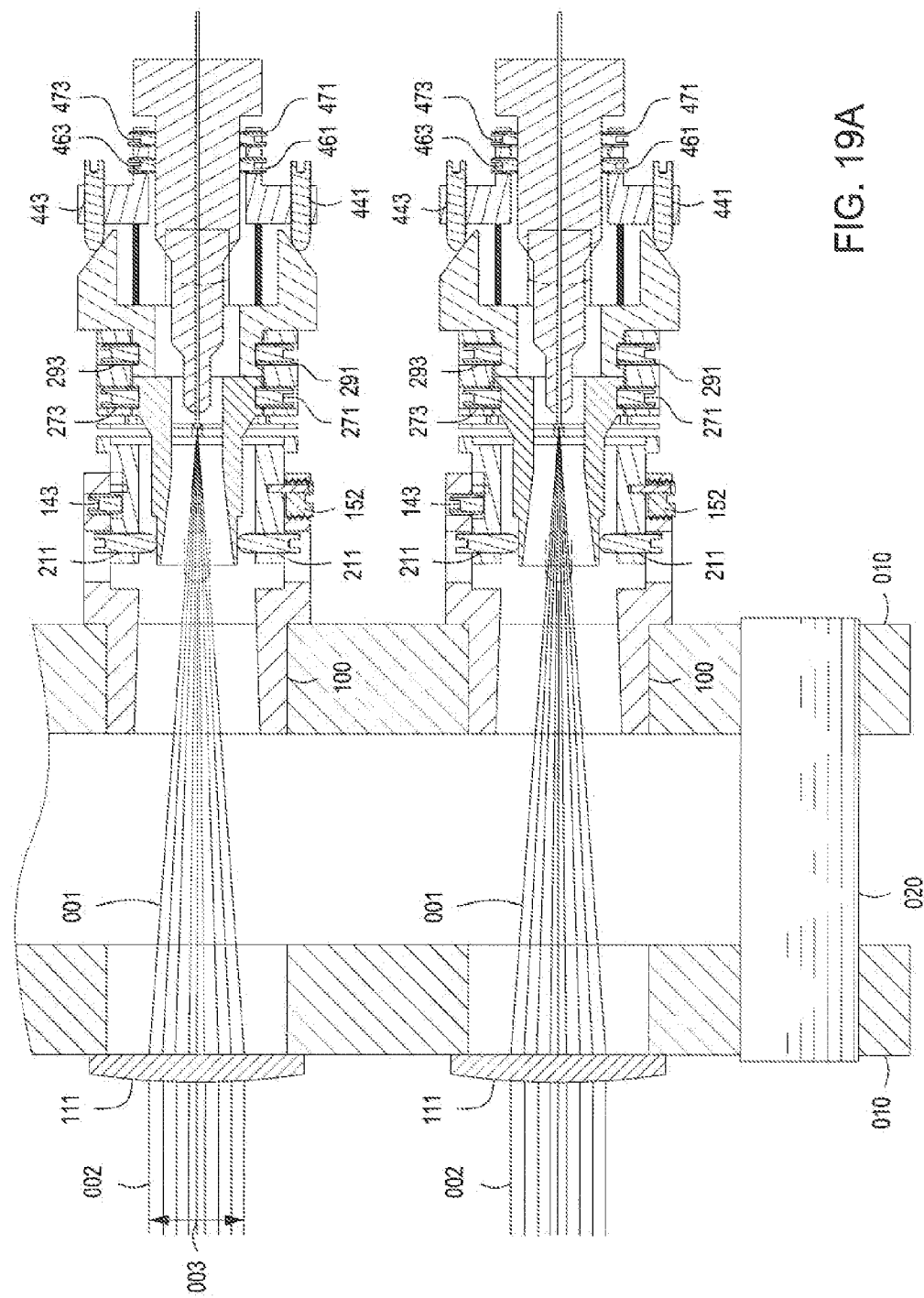
FIG. 19 (comprising FIGS. 19A, 19B and 19C) illustrates a modular design for an array of collimators having an alternative construction to the collimator mounting arrangement shown in FIG. 17, where a lens holder decouples the collimator lenses from the output of each collimator in the array.
Figure 19B:
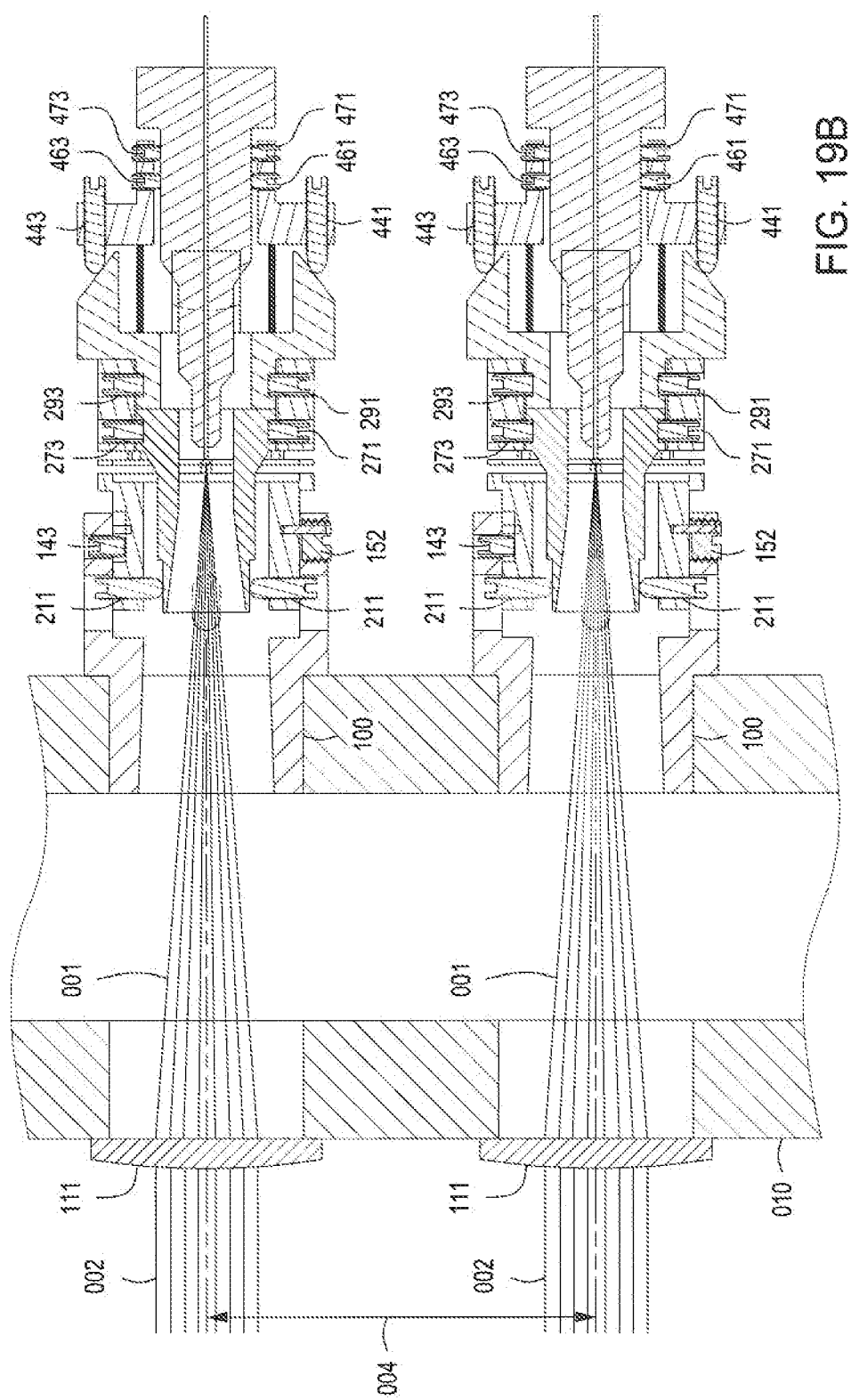
Figure 19C:
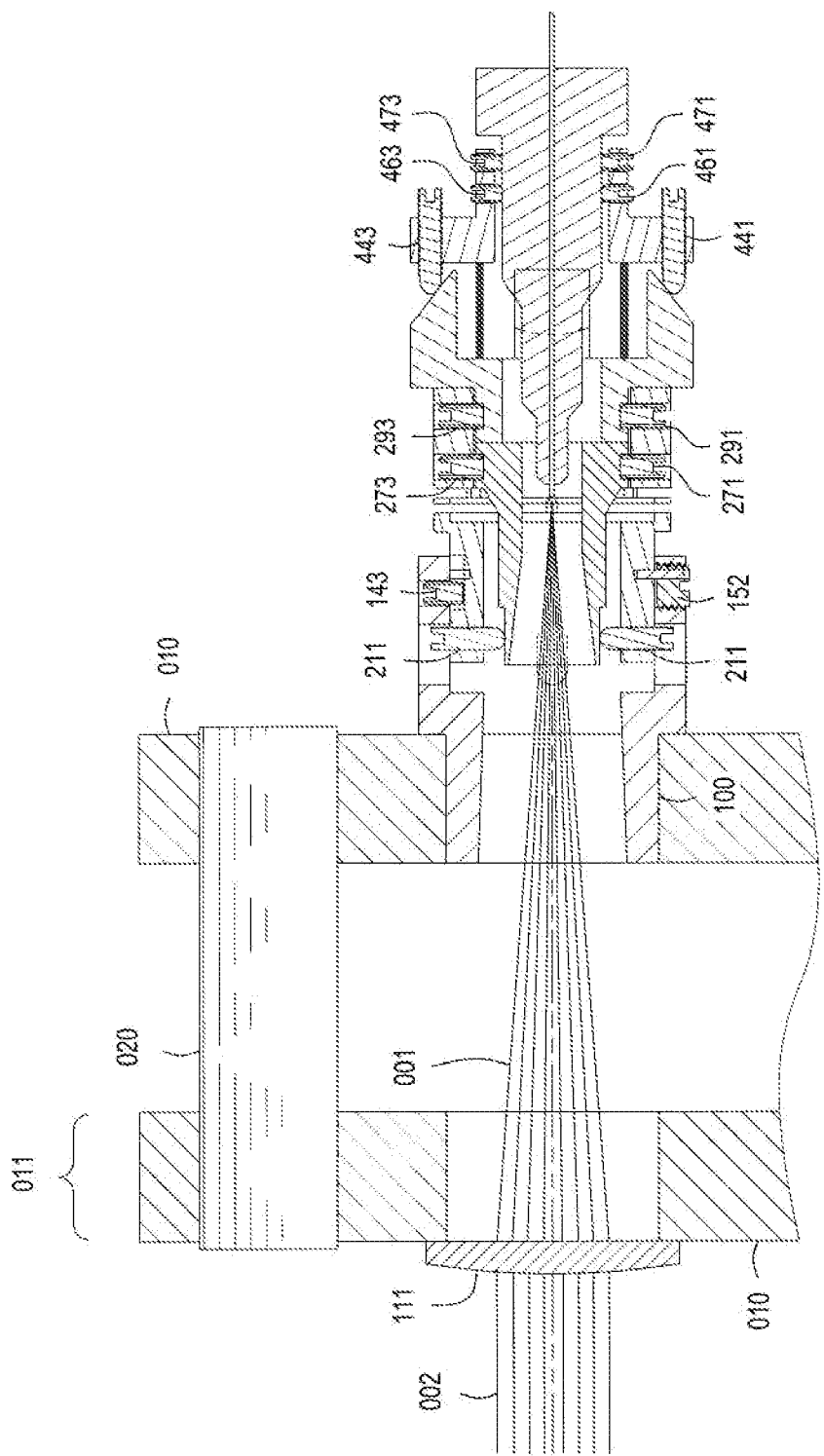

FIG. 7 illustrates a collimator 10 in accordance with an exemplary embodiment of the present invention having an integral lens (whereas in an alternative embodiment, described in relation to FIG. 19, the lens may not be integral with the assembled collimator), where the assembled collimator 10 is shown by FIG. 7A and FIGS. 7B, 7C and 7D illustrate details of the component nodes of the collimator. As shown in FIG. 7A, the collimator 10 includes the following five nodes (sometimes referred to as stages):

1. A hollow barrel node 100 for supporting a light collimating lens 111 at an upper end 110 thereof;

2. A Tip-Tilt-Z-node (T-T-Z-node) 200, composed from an upper part 201 (shown in detail 200 of FIG. 7B as well as FIGS. 9A, 9B and 9C) having regions 210 and 220 and a bottom part 202 having regions 270 and 290. Parts 201 and 202 are connected to each other through a flexible ring 203 having upper thumbs 231, 232 and 233 and bottom thumbs 251, 252 and 253. More specifically, parts 201 and 202 may initially be formed by a single cylindrical element, and upon forming three lateral cuts that extend through the sidewalls of the cylindrical element, but which cuts are angularly offset from each other by 120 degrees, enough material can be removed from a central cylindrical wall portion of element 200 so as to essentially separate element 200 into upper and lower parts 201 and 202, by leaving only angularly offset "thumb" portions of material 231, 232 and 233 attached to upper part 201 and thumb portions 251, 252 and 253 attached to lower part 202. Because the thumbs are the only material left connecting the upper part 201 to the lower part 202, they essentially form the flexible ring 203. Details of how flexible ring 203 allows for the bending adjustment of node 200 is described below in conjunction with FIG. 10.

Figure 10A:
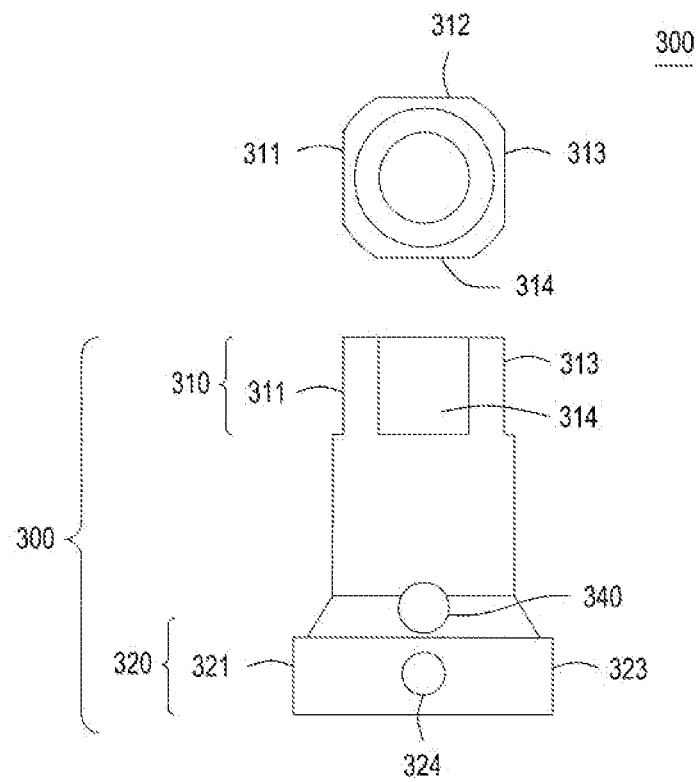
FIGS. 10A and 10B illustrate details of the assembly of the Tip-Tilt-Z node and Lever node as illustrated in FIG. 7A, and FIGS. 10C and 10D illustrate details of the interaction of the Tip-Tilt-Z node and Lever node for providing control of deviations of the fiber tip.
Figure 10B:
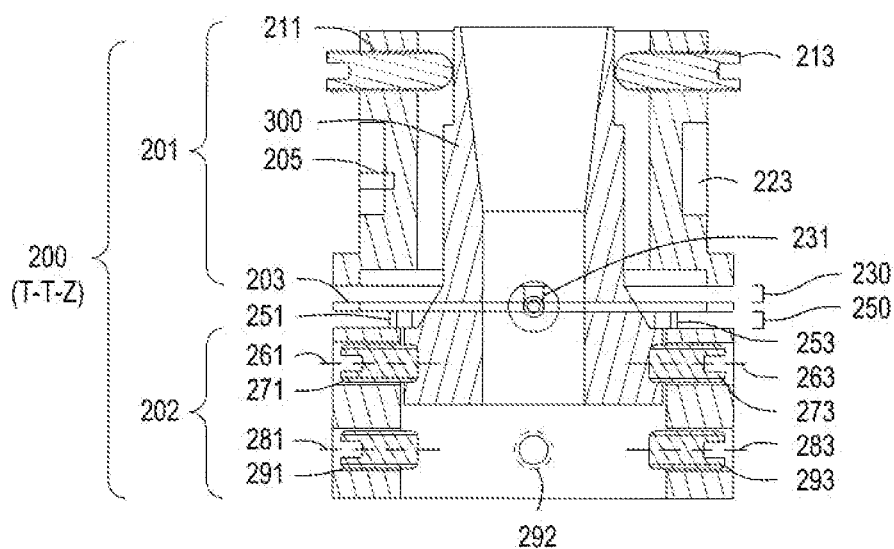
Figure 10C:
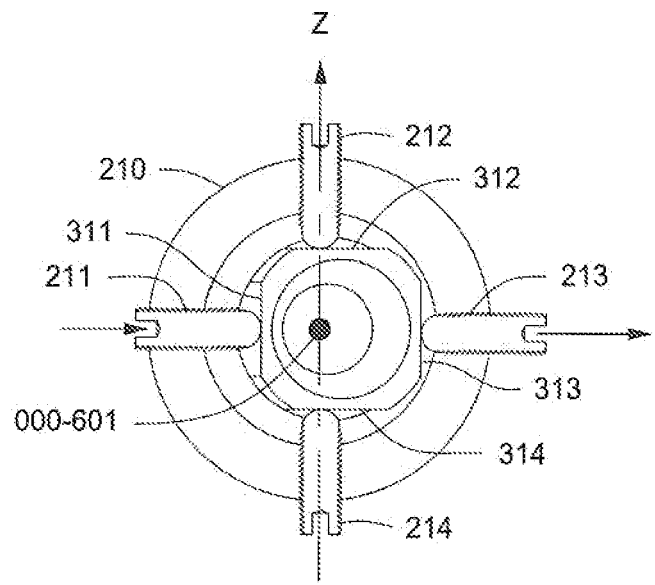
Figure 10D:
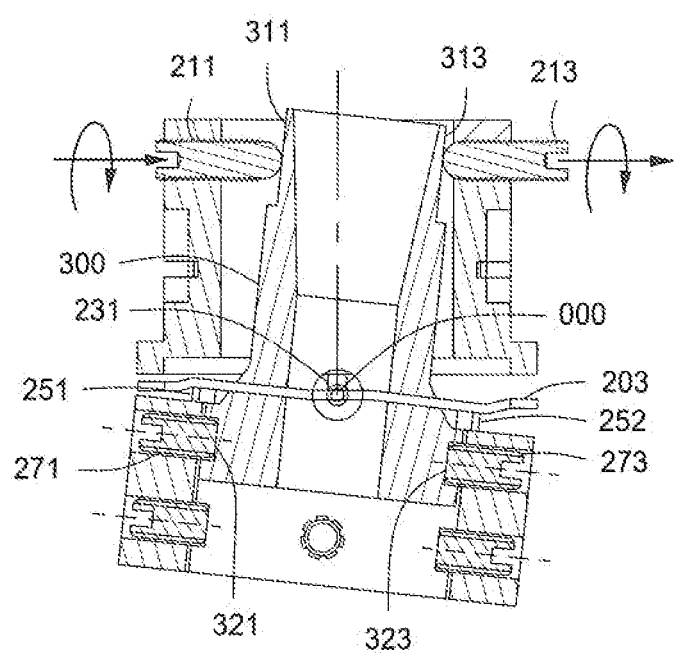
Figure 14A:
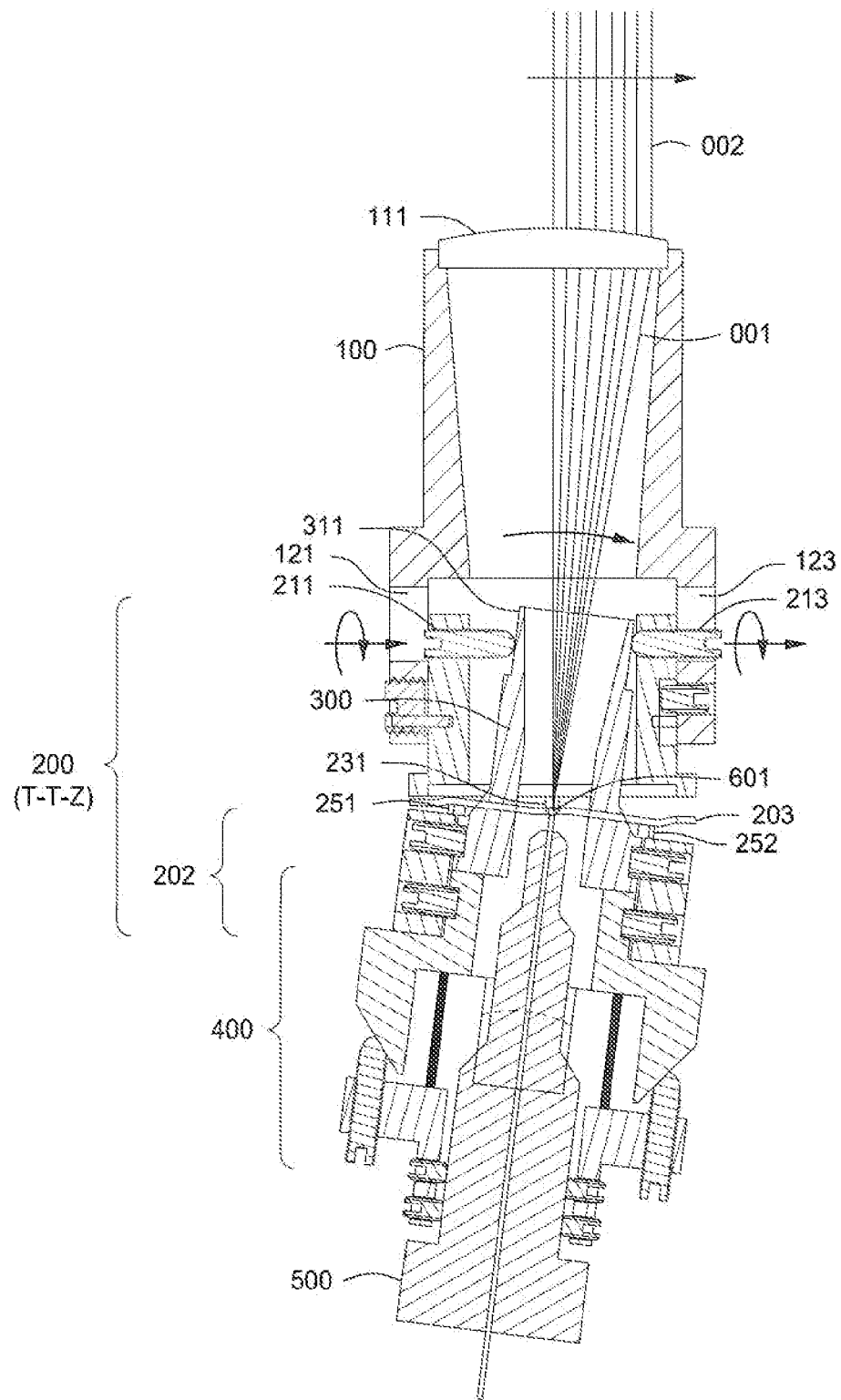
FIGS. 14A, 14B and 14C illustrate details of the interaction of the lower portion of the barrel node with the upper portion of the Tip-Tilt-Z node for aligning the fiber tip so as to control tilt of the emitting tip relative to the rotation point, in accordance with the exemplary embodiment of the invention shown in FIG. 7A.
Figure 14B:
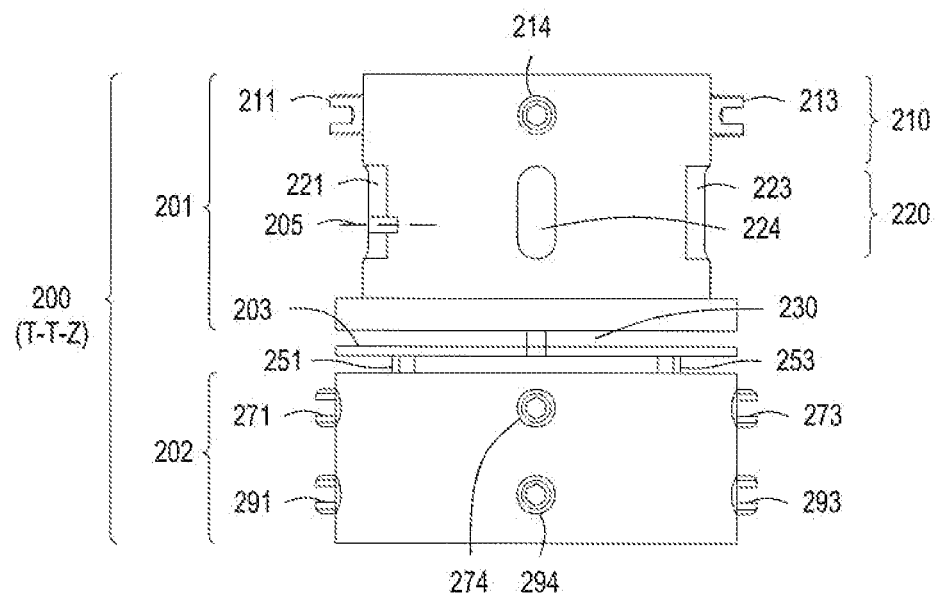
Figure 14C:
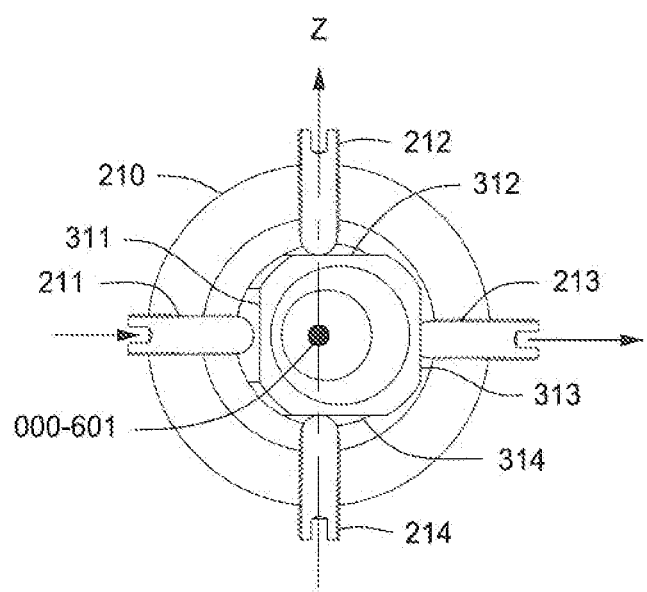

3. A lever 300, having a bottom part 301 firmly connected with the bottom part 202 of T-T-Z-node 200. An upper part of lever 300 is located inside of part 200 in the upper part 201, as shown in FIG. 10B and moveable therein to initiate tip-tilt adjustments by bending at ring 203, as shown in FIGS. 14A, 14B and 14C, described in greater detail below.

Figure 15B:
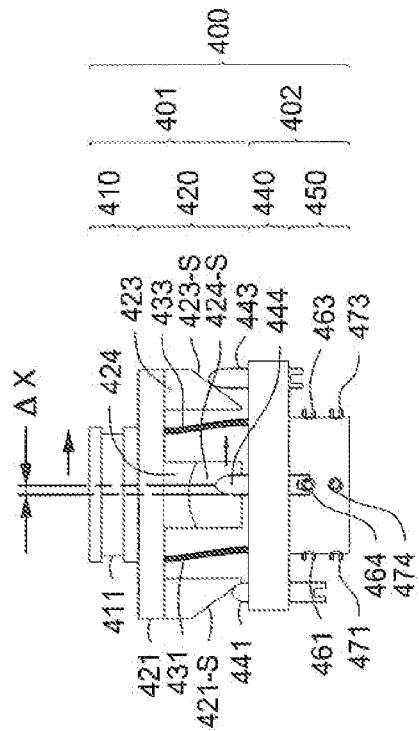
FIG. 15B illustrates a plan view of the two-part X-Y-Ω node portion, so as to show details for precise X-Y position alignment of the fiber tip, in accordance with the exemplary embodiment of the invention shown in FIG. 7A.
Figure 15A:
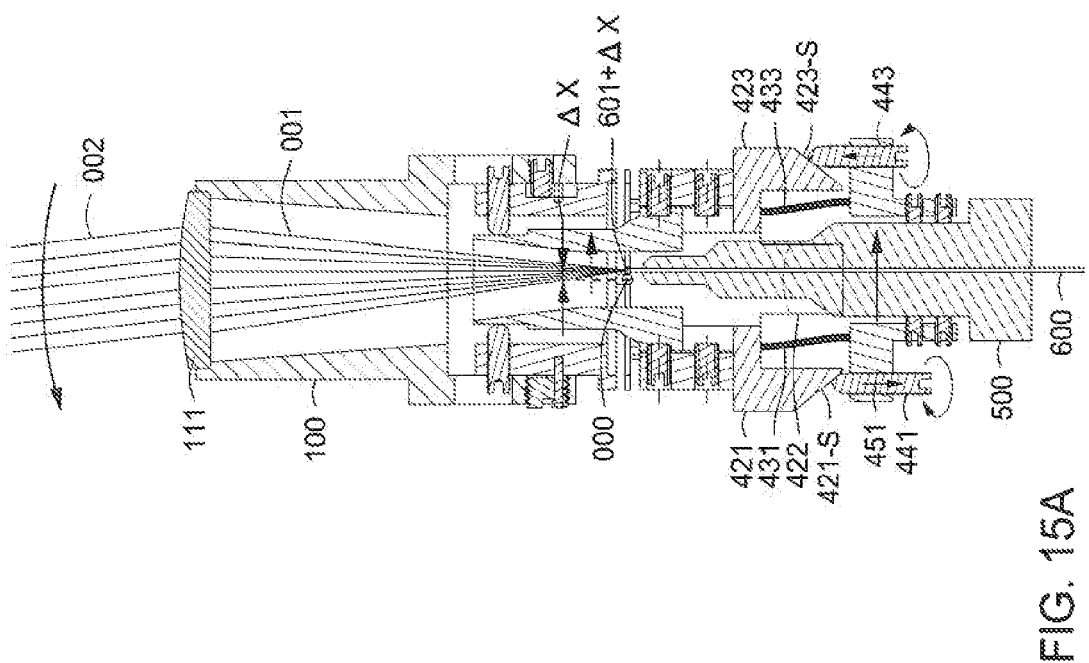
FIG. 15A illustrates a cross-section view of the X-Y-Ω node portion assembled to the lower portion of the T-T-Z node.

4. An X-Y-Ω node 400, composed from parts 401 and 402, where part 401 is firmly seated at the bottom of lever 300 within the bottom part 202 of T-T-Z-node 200. Parts 401 and 402 are connected with each other via a plurality of flexible rods 431, 432, 433 and 434 so as to allow rotation adjustment as shown in FIG. 12B and precisely controlled X and Y lateral adjustment, as shown in FIGS. 15A and 15B.

5. A fiber node 500 for holding the fiber optic 600. The fiber node 500 can comprise a standard fiber connector having normal or angled cleaving (PC or APC) at the tip end 601. The node 500 can be a fiber positioner with high frequency bandwidth having a rapidly controlled motion of the fiber tip 601 in focal plane of the lens 111, using, for example, a piezoelectric actuator, known in the art. Fiber node 500 is adjustably held within the lower part 402 of X-Y-Ω node 400 so as to allow coarsely controlled X, Y and Z adjustment, as shown in FIGS. 11B and 11C.

The barrel, T-T-Z, Lever and X-Y-Ω nodes all hollow, in that they have a central passageway where the light beam travels on its way from the emitting tip 601 from fiber node 500 to the lens 111.

In accordance with embodiments of the invention, controlled displacements, rotations and/or deformations between the nodes listed above, can meet the alignment requirements 1.1 to 1.5 listed below, in order to provide a fiber optics collimator having nine degrees of freedom for adjustment of the light beam and which is suitable for mounting in a densely packed array. The suitability being provided by the means for adjusting the alignment being simple rotational mechanisms, which are all accessible at the perimeter of the collimator.

Figure 11C:
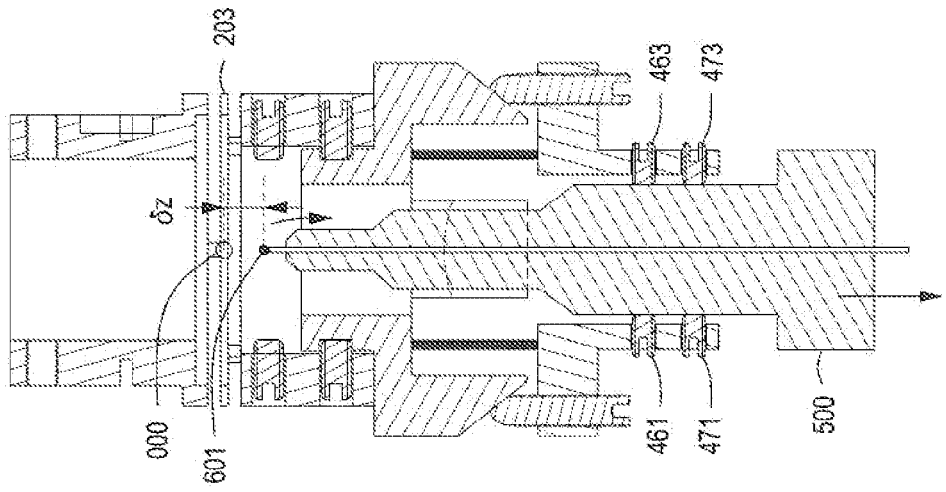
FIGS. 11A, 11B and 11C illustrate cross-section views of the X-Y-$\Omega$ node portion coupled to the lower portion of the Tip-Tilt-Z node, where
Figure 11B:
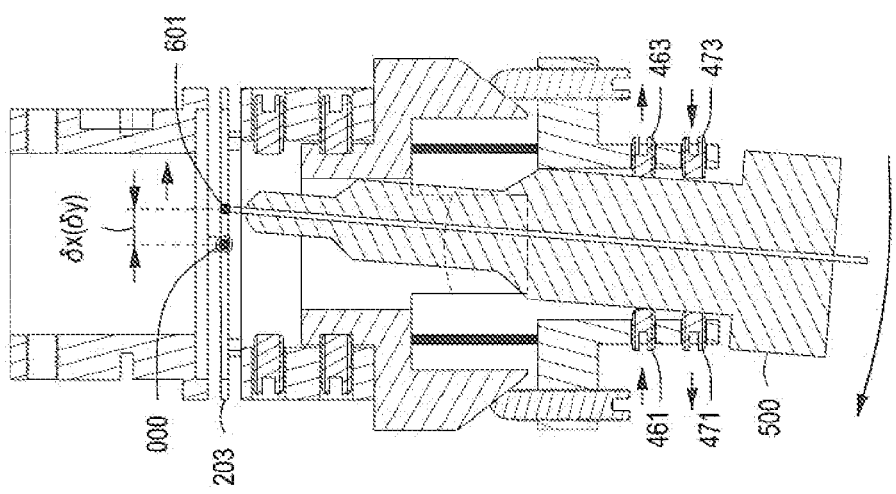

1.1—preliminary/coarse tip-tilt (δX and δY) adjustment of the node 500 within X-Y-Ω part 400, as shown in FIG. 11B and ΔZ adjustment as shown in FIG. 11C;

1.2—rotation of the X-Y-Ω part 400 within T-T-Z part 200 around the Z-axis, as shown in FIG. 12B;

1.3—bending of the T-T-Z node 200 around point 000 located at the center of the flexible ring 203, as shown in FIGS. 10D and FIGS. 14A, 14B and 14C

1.4—displacement of the T-T-Z node 200 inside of barrel 100 along the Z-axis, as shown in FIGS. 8 and 13; and 1.5—and finally, precise ΔX and ΔY parallel shifting of part 402 relative to the part 401 of X-Y-Ω-node through the S-bending of flexible pins 431, 432, 433 and 434, as shown in FIGS. 15A and 15B.

Overall Assembly View

Figure 1:
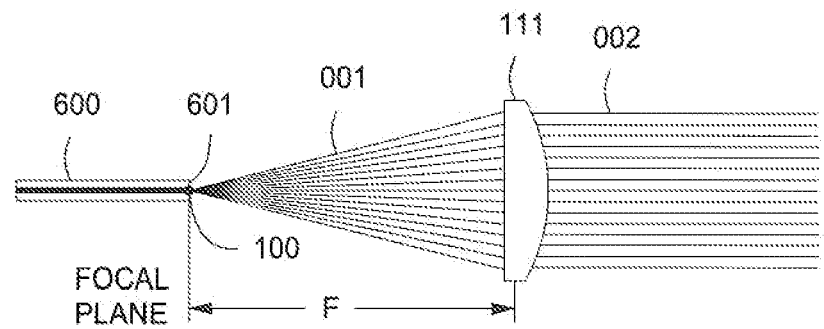
FIG. 1 is an idealized representation illustrating the light path within a typical fiber optic collimator.
Figure 2A:
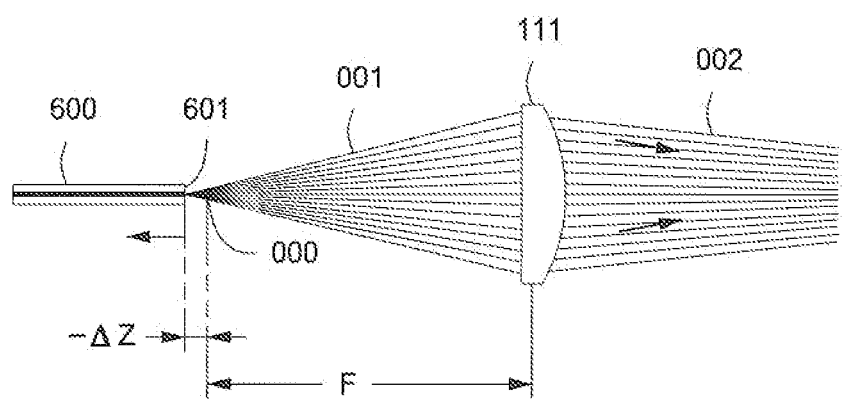
FIG. 2A and FIG. 2B are idealized representations illustrating the effect of a negative and positive longitudinal position displacement, respectively, of the emitting tip of the optical fiber shown in FIG. 1.
Figure 2B:
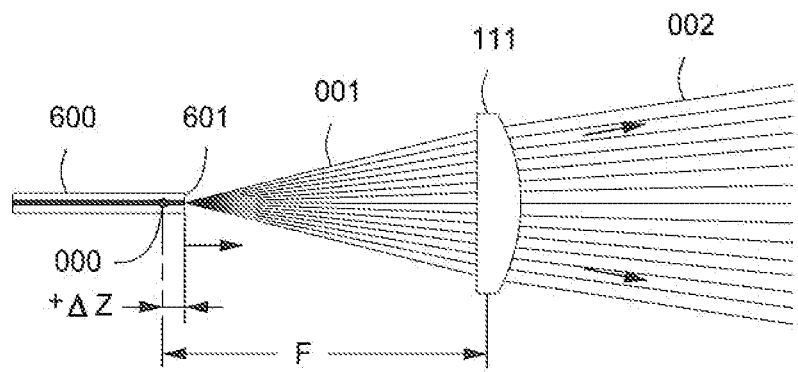
Figure 3:
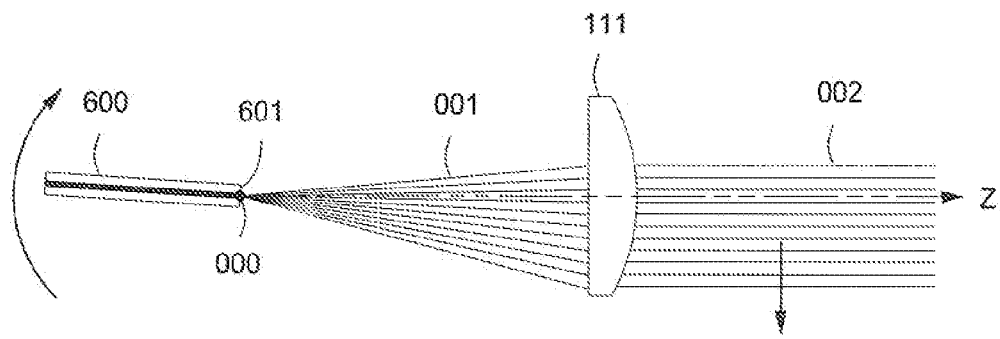
FIG. 3 is an idealized representation illustrating the effect of an angular position displacement (Tip-Tilt) of the emitting tip of the optical fiber shown in FIG. 1.

As shown in the general view FIG. 1 and more specifically in at least FIG. 7A, collimating lens 111 is contained in an upper end 110 of barrel 100, A bottom part of barrel 100 contains three sets of holes located in areas 120 and 130. Two pairs of orthogonally positioned holes 121, 123 and 122, 124 in the area 120 allow access to screws 211, 212, 213 and 214. Four threaded holes 131, 132, 133 and 134 are located in the area 130, containing four screws 141, 142, 143 and 144 used for locking the node 200 inside of barrel 100, At least one threaded hole 151 is located in the area 130, preferably in between neighbor holes 131 and 132, or 132 and 133, or 133 and 134, or 134 and 131, The hole 151 contains a screw 152 as shown in FIGS. 8 and 13A, with a slot 153 for a screwdriver. The screw 152 contains a hole 155 parallel to a rotation axis 154 so as to provide an eccentric shift of a distance r, as shown in FIG. 13B. A stiff pin 156 is firmly installed into the hole 155 and an exposed end of pin 155 may slide inside of groove 205 of part 201 of node 200, as shown in FIGS. 8, 9 and 13. During the rotation of screw 152, the pin 156 enables movement in the range of +/−r, thereby providing a displacement of 2r of the T-T-Z part 200 inside of barrel 100 along the Z-axis, as shown in FIGS. 13B and 13C.

Lever 300 has upper 310 and bottom 320 ends, as also shown in FIG. 10. Bottom end 320 is connected to pail 202 of node 200 by means of screws 271, 272, 273 and 274 in threaded holes 261, 262, 263 and 264. The screws 211-214 control the orientation of lever 300 by pushing its flat surfaces 311-314. The surfaces 311-314 form the rectangular arrangement, as shown by the top view in FIGS. 10A and 10C. With this arrangement, the lever 300 can be deviated relative to the central point 000, located in the central area of the flexible ring 203, as shown in FIG. 7, FIG. 9B, FIG. 9D and FIG. 14A. The final position of lever 308 can be locked in place with screws 211-214 by tightening the opposite screws. For example, to lock the tilting of lever 300 in the plane of the paper, the screws 211 and 213 should both be turned clockwise, while the tilting in this plane is accomplished by turning one screw clockwise and the opposite screw counterclockwise, and shown in FIGS. 10D and 14A. The controlled tilting of the upper part of lever 300 in the plane of drawing is accompanied with sliding the surfaces 312 and 314 between the screws 212 and 214 of FIG. 14. The deviation of lever 300 activates the deviation of the bottom part 202 of the node 200, together with node 400 and ultimately the deviation of the fiber node 500 with deviation of fiber tip 601 around the point 000, as shown in FIG. 10D and FIG. 14A.

The X-Y-Ω Node 400

The X-Y-Ω node is a particularly important multi-functional node, where X and Y means displacement of the emitting tip 601 in the X and V directions from the center 000, and "Ω" means the rotation of the node 400 around the coaxial axis of the fiber 600 at angle "Omega". The X and displacements are adjustable both during a preliminary "coarse" alignment using screws 461-464 and 471-474 of part 450 of node 400, shown in FIG. 7D and described below with respect to FIG. 11, as well as during a final "precision" alignment, using screws 441-444 and slanted surfaces 421-S to 424-S of parts 440 and 420, respectively, of node 400, described below with respect to FIG. 15. The rotation adjustment Ω is described below with respect to FIG. 12. All of these adjustments are able to be performed in a manner that is decoupled one from another.

Such adjustments are extremely important since, for example, with an output lens 100 having a diameter 30 mm, a diffraction limited spot will have a diameter of about 3 cm at a distance of 1 km (wavelength 1 mkm). If the focal length of the lens 100 is 15 cm, a 3 cm displacement at 1 km will occur when the tip 601 is displaced by only a distance of 5 microns. In order to target the same spot with a collimated beam from a neighbor collimator requires submicron accuracy for the positioning of the tips 601 of the neighbor collimators. Embodiments of the present arrangement provides for such alignment accuracy as well as a resistance to change due to temperature and vibration so as to have long-term stability.

For assembly, an upper part 410 of node 400 is installed into the bottom part 202 of node 200. A bottom part 402 of node 400 holds the fiber optic node 600 including the fiber optic 600 therein with emitting tip 601.

Rotation of node 400 with respect to node 200 (and therefore also node 100) allows for adjustability of the polarization plane 020 of the light beam emitted from tip 601, as shown in FIG. 12B.

Figure 12A:
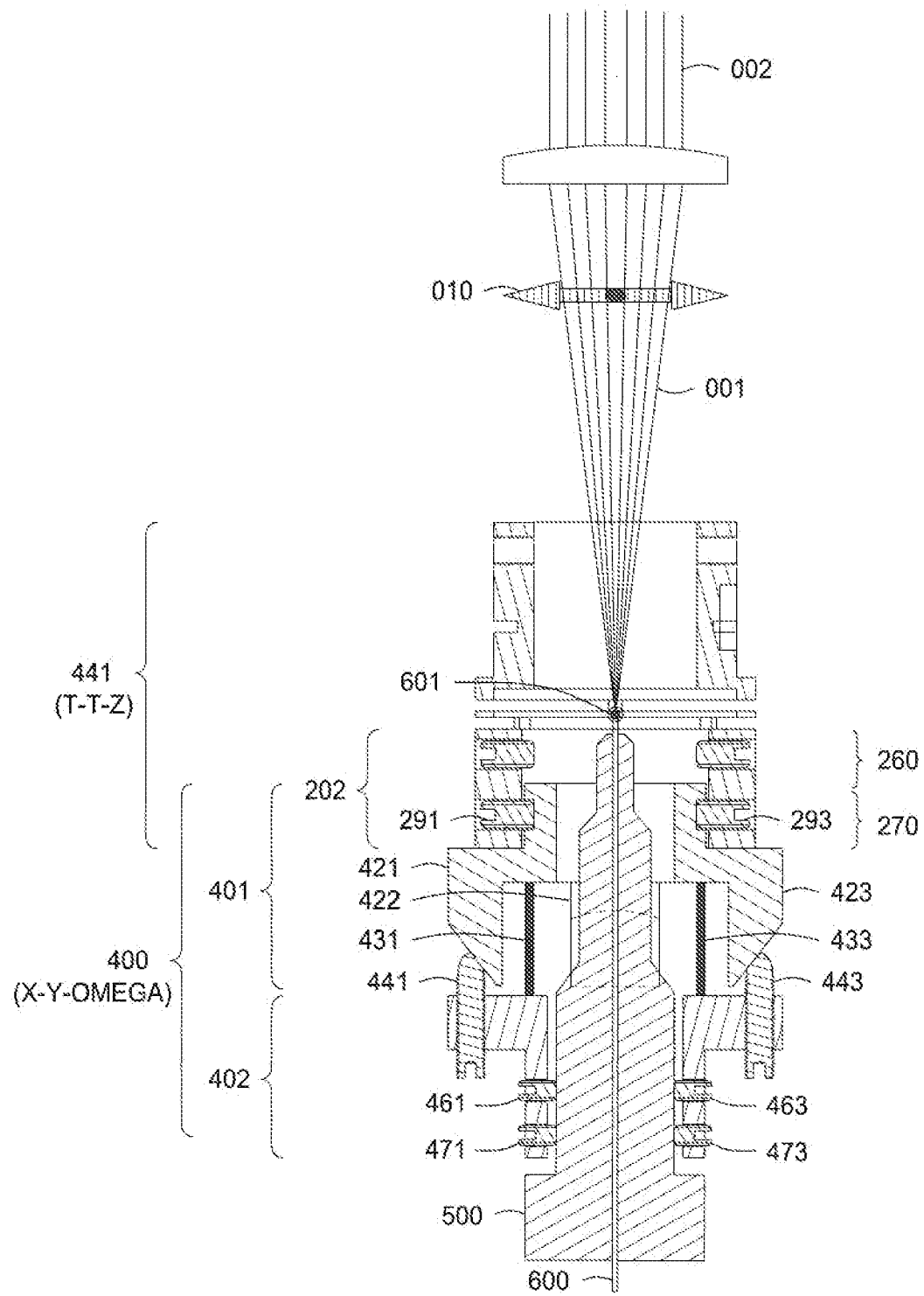
FIG. 12A illustrates a cross-section view of the X-Y-Ω node portion assembled to the lower portion of the T-T-Z node.
Figure 12B:
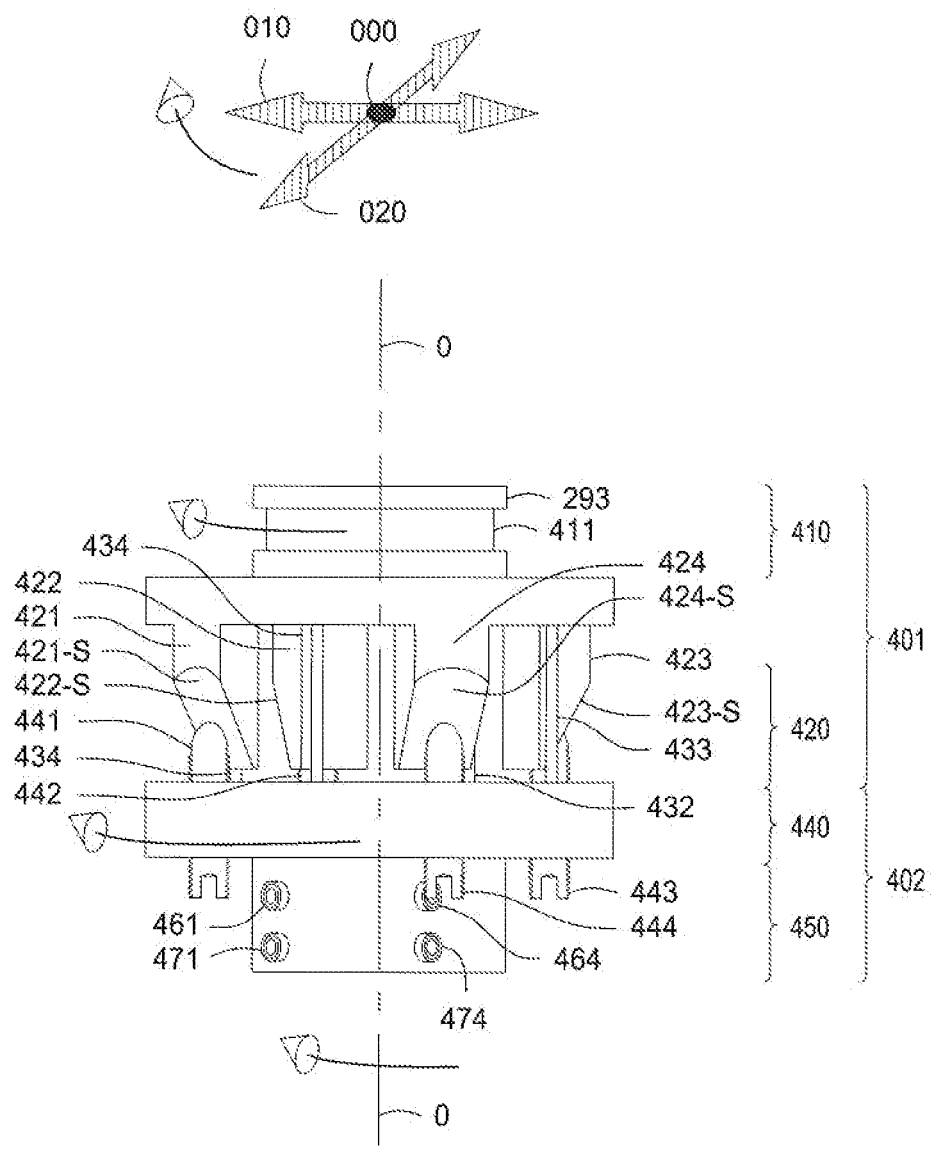
FIG. 12B illustrates rotation of the X-Y-Ω node portion with respect to the T-T-Z node for aligning the polarization plane of the light beam, in accordance with the exemplary embodiment of the invention shown in FIG. 7A.

The angular orientation of the node 400 with a selected polarization plane 010, as shown in FIG. 12A, can be adjusted into a desired position by loosening screws 291, 292, 293 and 294, which can then slide in a groove 411 at upper end 410 of node 400 until a final angular orientation is achieved. Screws 291-294 keep the node 400 inside of tilting part 202 of T-T-Z node 200 during such angular (Ω) alignment, and are then tightened so as to lock the angular orientation of node 400 into a fixed alignment with the selected polarization plane 010.

Figure 4:
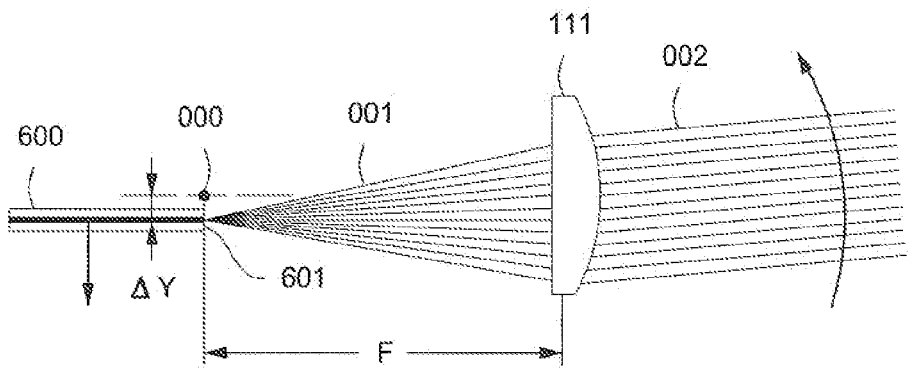
FIG. 4 is an idealized representation illustrating the effect of a lateral position displacement of the emitting tip of the optical fiber shown in FIG. 1.
Figure 5:
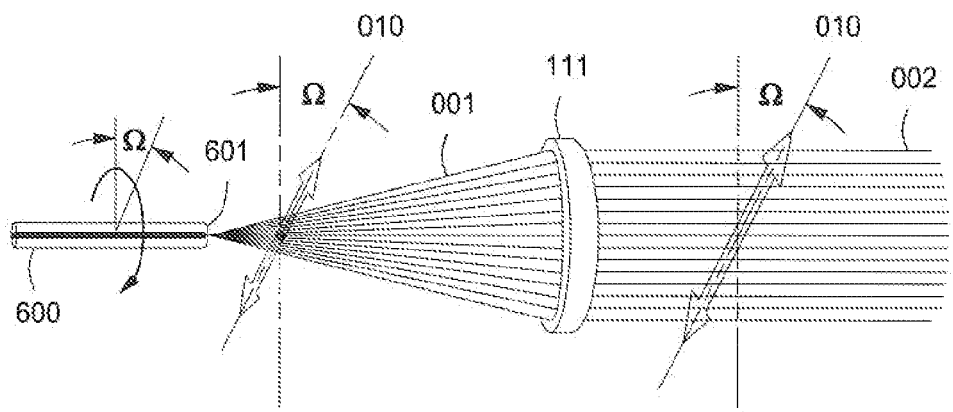
FIG. 5 is an idealized representation illustrating the effect of a rotational position displacement of the emitting tip of the optical fiber shown in FIG. 1.
Figure 6:
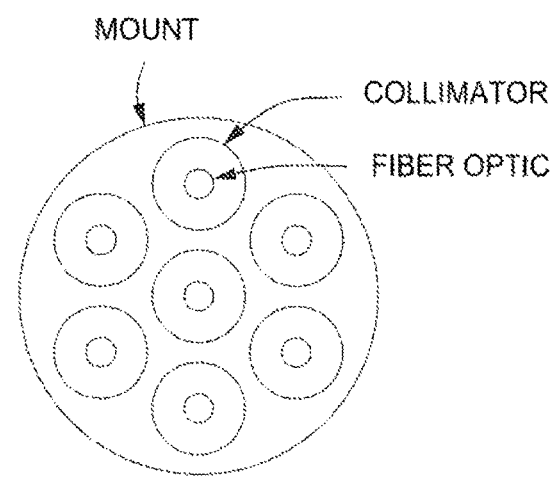
FIG. 6 is an idealized representation illustrating dense packing within a mount of a plurality of fiber optic collimators.

So as to allow the above-noted precision X and V displacements, in a manner that is decoupled from other, adjustments of the collimator, the parts 401 and 402 of the node 400 are connected with each other using stiff, but flexible, rods 431, 432, 433 and 434, so as to form a three-dimensional parallelogram. The flexible rods are flexible in their lateral axis but not flexible along their longitudinal axis. Because of the flexible rod connection, the bottom part 402 (containing parts 440 and 450, where part 450 holds the fiber node 500) can only be moved in a manner that is parallel to the part 401, such movement occurring, in accordance with the illustrated embodiment, when shearing force is applied to part 402 relative to part 401, as shown in FIG. 15. To accomplish precision X-shift (shifting to the right in the plane of the drawing) shearing force is applied by interaction of screws 441 and 443 (in threaded holes 451, 453 of part 440) with slanted surfaces 4210-S and 423-S of solid legs 421 and 423 in an area 420 of part 401. Rotation of screws 441 and 443 in opposite directions, counterclockwise and clockwise, respectively, as shown in FIG. 15, leads to "climbing" of screw 443 on surface 423-S and "pulling" the part 402 to the right against S-bending of rods 431-434. The final locking of the position of part 402, together with part 450 and fiber node 500, can be accomplished by tightening the screws 441 and 443 by turning both screws clockwise. During the X-shift, the screws 442 and 444, which are used for controlling the Y shift in a manner similar to that described above or screws 441 and 443 for controlling the X shift, are sliding on inclined surfaces 422-S and 424-S, which surfaces are visible in FIG. 12B, Part 402 remains parallel to part 401 during X-shifting (as a result of the property of parallelogram's), and the fiber node 500 maintains the orientation of long axis 0-0 and the Z-orientation of the fiber 600, as a result of the decoupling of these adjustments. Accordingly, the resulting X-shift placement ΔX of the fiber tip 601 occurs without tilting or focusing-defocusing of the collimated beam 002. The divergent beam 001 moves to the right and the collimated beam 002 deviates counterclockwise, as shown in principle in FIG. 4 and more specifically in FIG. 15A.

The precision of the X or Y displacement can be optimized by variation of the slanting angle of surfaces 421-S-424-S. The less the angle between planes of slanted, surfaces 421-S and 424-S and the Z axis of the collimator, the higher the sensitivity of the X-Y displacements caused by rotation of screws 441-444. With the present arrangement, the desired submicron accuracy for the positioning of tip 601 is possible.
Assembly of the Barrel Node 100 and the T-T-Z-Node 200

FIGS. 8A and 8B illustrate an outside view of the assembly of the barrel node 100 and the T-T-Z-node 200 illustrated in FIGS. 7A and 7B, and the effect of a Z-axis deviation between these nodes. Upper part 201 of T-T-Z node 200 is installed into the bottom part of barrel 100 in a manner that can allow limited sliding adjustment between the two nodes along their Z-axis. Rotation of screw 152 by ½ turn induces a Z displacement ΔZ=2r of T-T-Z node 200 inside of barrel 100 along the Z axis, as described in more detail below.
Details of the T-T-Z Node 200

Figure 9A:
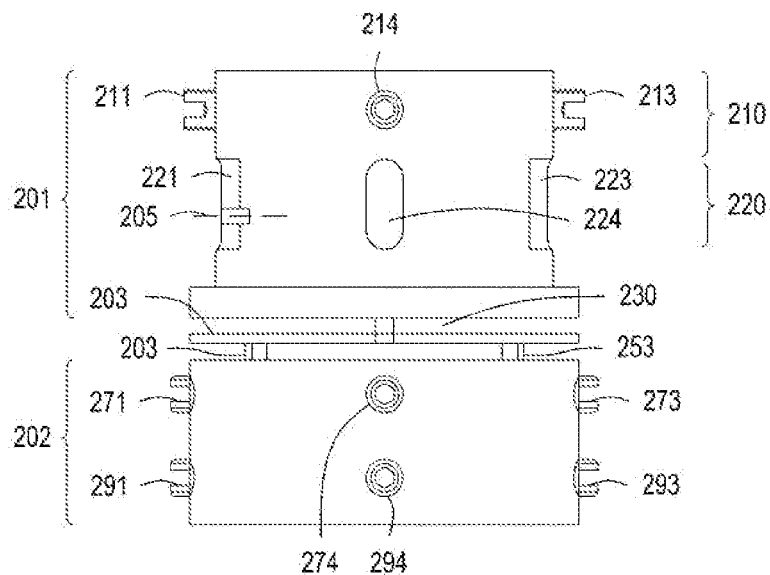
FIGS. 9A, 9B and 9C illustrate details of the Tip-Tilt-Z node which provides control of the tip-tilt (T-T) and Z (Z) deviations of the fiber tip illustrated in FIG. 7A.
Figure 9B:
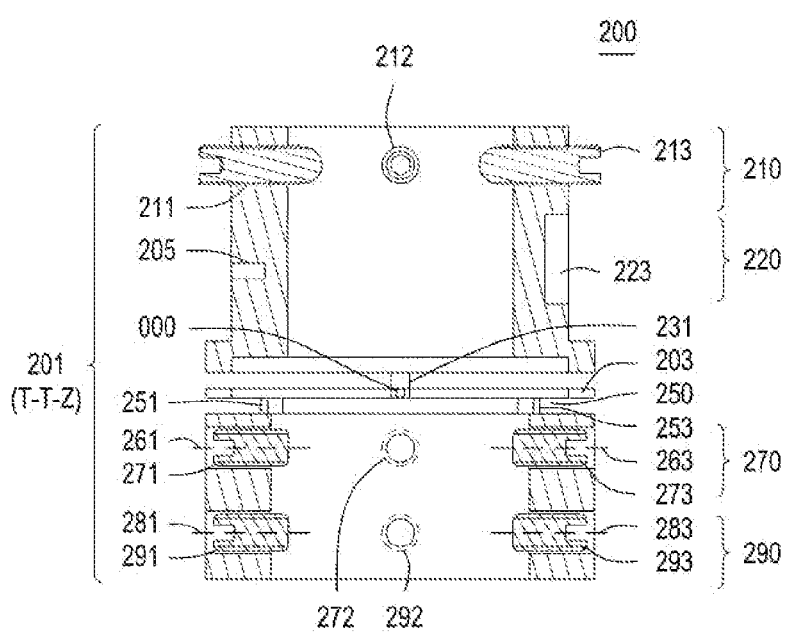
Figure 9C:
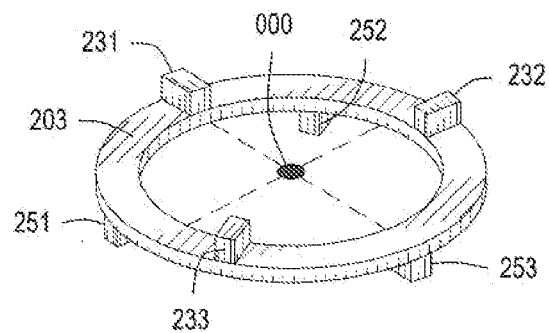

FIGS. 9A, 9B and 9C illustrate details of the T-T-Z node 200 which is adjustable to provide control of the tip (T), tilt (T) and Z (Z) deviations of the fiber tip 601 at a location near point 000, as illustrated in FIG. 7. As shown in FIGS. 9A, 9B and 9C, node 200 consists of three basic parts: 201, 202 and 203. Part 202 can be deviated (displaced) by a controlled angle relative to the part 201. The deviation is accompanied by a bending of the flexible ring 203. As described above, ring 203 is formed by angled cuts through the side all of part 200 so that a top level 230 of ring 203 is connected to the bottom of the part 201 using top thumbs (protrusions) 231, 232 and 233 and a bottom level 250 of ring 203 is connected to the to of the part 202 using bottom thumbs 251, 252 and 253. The top thumbs are distributed in-between the bottom thumbs in an alternating manner, thereby providing for angled movement between parts 201 and 202 in the spaces between neighboring top and bottom thumbs of ring 203. The amount of thumbs on top level 230 and bottom level 250 are equal in number, and can be two or more. For optimum stiffness and deviation amplitude, of part 202 relative to part 201, three or four thumbs are preferable.

For increased deviation of part 202 relative to part 201 a second flexible ring not shown) similar to flexible ring 203 can be added in-between parts 201 and 202, the second flexible ring having corresponding thumbs.

The T-T-Z node 200 can be fabricated from one piece of stiff metal (steel, titanium, stainless steel etc.), and a slitting saw can be used for cutting the slots between part 201 and 203 and between parts 203 and 202, thereby forming the flexible ring 203 and thumbs 231-233 and 251-253.

The upper part 201 of T-T-Z node 200 is installed into a bottom portion of the barrel 100, as shown in FIGS. 7A, 8 and 13. The outer diameter of part 201 is slightly less than the inner diameter of the bottom portion of part 100, thereby allowing part 201 to slide along a central axis (Z-axis) within barrel 100. The movement of part 201 along the Z-axis is caused by stiff rod 156 of the Z-screw 152, shown in FIGS. 7A, 8 and 13. This rod 156 mates with a horizontal groove 205 on the outer cylinder surface of part 201. The vertical displacement of rod 166 is controlled by rotation of the screw 152 by means of a screwdriver, such as W3 shown in FIG. 17A, described below. Thus, the screwdriver W3 uses the slot 153 on the screw 152 to cause alignment adjustability of part 200 (and all parts connected thereto) along the Z-axis.

Upper screws 211-214 may slide in slots 121-124 of barrel 100 to help ensure controlled movement of part 201, as also shown in FIGS. 7, 8 and 13. That is, grooves 221-224 of part 200 may slide along screws 141-144 of barrel 100 as shown in FIGS. 7A and 13, restricting the mutual rotations of barrel 100 and T-T-Z-node 200. The optimum Z-position of part 200 relative to the part 100 can be locked with screws 141-144 by tightening these screws, as shown by FIGS. 7A and 13.

The screws 271-274 in bottom area 270 of part 202 of T-T-Z-node 200 are used to lock the bottom part 320 of lever 300 at the area of dimples 321 of of lever 300. The lever 300, in combination with bottom part 202, is then able to be deviated with respect to top part 201 by use of screws 211-214, which forces the deviation of part 202 relative to the part 201 so as to provide control of tip-tilt alignment, as shown in FIGS. 10 and 14. The screws 291-294 shown in FIGS. 9A and 9B at the bottom part 202 of T-T-Z-node 200, are used to lock the angle of Omega rotation of the node 400 relative to the Z-axis in node 200, as shown in FIGS. 12A and 12B.

The number of threaded holes and screws on levels 270 and 290 can be two or more, as shown in FIGS. 7, and 9A and 9B. The preferable amount of screws to use is three or four.

The amount of screws on level 210, as shown in FIGS. 7, 9 and 14 is four, two pairs, for providing the tip and tilt deviations of part 202 relative to part 201 and for locking the deviations once the desired adjustment is made.

The amount of longitudinal grooves 221-224 can be two or more, preferably four, along with screws 141-144 (and four holes on each level 270 and 290 for simplicity of fabrication).

The slot 205 in part 201 can be a straight groove, as it is shown in FIGS. 9A and 9B. In an alternative embodiment, slot 205 can be replaced with a he circular groove having a rectangular profile fabricated as well on the cylinder surface of part 201, not specifically shown.
Assembly Details of the T-T-Z Node 200 and Lever 300

FIG. 10 illustrates details of the assembly of the T-T-Z node 200 and lever node 300, in conjunction with an explanation of controlled bending of node 200. FIGS. 10A and 10C are outside views of lever 300, a side view and a top view, respectively. FIG. 10B is an inside view of assembly 200 and 300 and illustrating lever 300 and bottom part 202 of node 200 that are not deviated with respect to each other, and FIGS. 10C and 10D illustrate lever 300 and bottom part 202 of node 200 that are deviated with respect to each other owing to the action of screws 211 and 213 and flexibility of ring 203.

Alignment of the Fiber Tip 601 Near the Rotation Point 000 for Tip-Tilt Deviations, a First Step in an Alignment Procedure for the Present Arrangement, and Providing Adjustment of Three Degrees of Freedom (x, y, z)

Figure 11A:
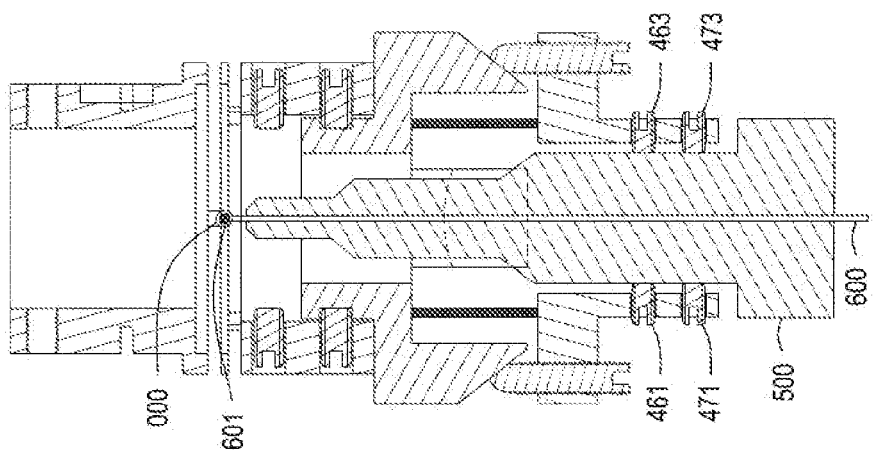

FIG. 11A illustrates the fiber tip 601 located on the Z axis at point 000. At this step the lens 111 is not necessary. During a later step in the alignment procedure, the point 000 will be adjusted to coincide with the focus of lens 111.

FIG. 11B illustrates controlled displacement of tip 601 from the center 000 to the right (by an amount δX or δY), using the displacement to the left of screws 471, 473 of lower level 470 or/and the displacement to the right of screws 461, 463 of upper level 460. The control of displacement of tip 601 toward and backward to an observer of FIG. 11 (perpendicular to the plane of the Figure) is accomplished using screws 462, 464 of upper-level 460 and screws 472, 474 of bottom level 470 (not shown).

FIG. 11C illustrates controlled displacement of tip 601 downward from the center point 000 using the displacement of node 500 in the δZ direction by loosening screws 461-464 and 471-474 at both the upper and lower levels 460 and 470, and then tightening these screws after reaching coincidence of fiber tip 601 with point 000.

The alignment of 601 with point 000 effectively terminates:
a) the wobbling of tip 601 during adjustment of the polarization plane, described as step 2, and
b) the X,Y shifts of fiber tip 601 from 000 during tip-tilt alignment, described below as step 3

Alignment of the Polarization Plane, a Second Step in an Alignment Procedure for the Present Arrangement, and Providing Adjustment of a Fourth Degree of Freedom FIG. 12A illustrates selection of a plane 010 as a polarization plane. FIG. 12B illustrates alignment of a current polarization plane 020 into coincidence with the selected polarization plane 010 by rotation of node 400 an angular amount Ω around the Z axis of coaxial symmetry (0-0) of node 400. The screws 291-294 are recessed in a circular groove 411 and are used to hold the node 400 in a permanent Z position and also allow easy rotation of node 400 about the Z axis when they are loose. After coincidence is reached with the selected polarization plane 010 by rotation of node 400, the screws 291-294 are tightened so as to lock-in the selected polarization alignment.

Alignment of Tip-Tilt of Fiber Tip Relative to the Rotation Point 000, a Third Step in an Alignment Procedure for the Present Arrangement, and Providing Adjustment of Fifth and Sixth Degrees of Freedom In this step the divergent beam 001 is adjusted so as to hit the lens 111 with optimized filling efficiency. The maximum intensity of of the Gaussian beam 001 should coincide precisely with the center of lens 111. Upon such coincidence we get the best practical efficiency, by using the most powerful central fraction of Gaussian beam, typically 90% efficiency. As shown in FIG. 14, the screw 211 pushes the lever 300 at a flat surface 311 of lever 300. In response, the lever 300 deviates around point 000 in conjunction with deformation of flexible ring 203. The upper surfaces of thumbs 231, 232 and 233 are connected to the bottom part 201 of node 200 and the lower surfaces of thumbs 231, 232 and 233 are connected to the upper surface of the flexible ring 203. The thumbs 251, 252 and 253 connect the bottom surface of flexible ring 203 with the top surface of part 202 of node 200. When screw 213 is rotated so as to move to the right synchronously with a corresponding rotation of screw 211, lever 300 deviates a corresponding amount to the right (as shown in FIG. 14C). After alignment of the beam centroid in the central, area of lens aperture 111, both screws 211 and 213 should be tightened so as to provide a stiff coupling of parts 200 and 300.

During deviation of lever 300 to the right, the parallel surfaces 312 and 314 slide between screws 212 and 214, responsible for tip-tilt deviation of lever 300 in the perpendicular direction.

To control the deviation of lever 300 in a direction perpendicular to the plane of the drawings, screws 212 and 214 should move synchronously in the same direction, that is, in a manner similar to that described for movement of screws 211 and 213. The parallel surfaces 311 and 313 of the lever 300 will slide between screws 211 and 213.

Alignment of the Z-Axis Position for focus Control, a Fourth Step in an Alignment Procedure for the Present Arrangement, and Providing Adjustment of a Seventh Degree of Freedom The goal of focus control alignment is to establish a parallel output beam 001, that is, neither convergent nor divergent. FIG. 13 illustrates assembly of the barrel 100 with the T-T-Z node 200. FIG. 13A is an outside view of the assembly and FIGS. 13B and 13C are inside views, showing focus control and de-focus control, respectively. Recall that screw 152 contains the eccentric rod 156 for shifting a distance r upon rotation of screw 152 on its rotation axis 154. The node 200 has a groove 205, cut over a part of the cylindrical surface of node 200 (or over the circumference of the cylindrical surface), as shown in FIG. 9C. The depth of the groove 205 is dimensioned to accommodate the rod 156. The width of the groove 205 allows the rod 156 to smoothly slide in the groove 205. The node 200 can be moved along the Z axis a total distance in the ΔZ direction equal to 2r upon rotation of the screw 152 by 180° around rotation axis 154.

The screws 141-144 (only one screw 143 is shown of four evenly located screws having 90° angular spacing) slide in longitudinal grooves 221 224. In FIG. 13B only one groove 223 is shown. In FIGS. 9A and 9C other longitudinal grooves 221, 223 and 224 are visible. Screws 141-144 shown in FIGS. 7 and 8 prevent the rotation of node 200 about its main axis of symmetry. Screws 141-144 are tightened after focus defocused alignment, as shown in FIGS. 13B and 13C. The part 201 of node 200 may contain additional longitudinal grooves and node 100 may contain corresponding additional screws so as to enhance the stiffness of the aligned assembly 100, 200.

Precision Control of the X-Y Position of the Fiber Tip, a Fifth Step in an Alignment Procedure for the Present Arrangement, and Providing Adjustment of Eighth and Ninth Degrees of Freedom FIG. 11 shows how the tip 601 is able to be very accurately positioned at point 000, with an accuracy on the order of a fraction of a micron, so as to provide targeting of a diffraction limited spot formed with the collimated beam on a remote target.

As previously noted, in order to target the same spot with the collimated beam from neighbor collimators requires submicron accuracy for the positioning of tip 601. Embodiments of the present arrangement provides for such alignment accuracy as well as the ability to hold the accuracy under harsh temperature and vibration conditions, so as to provide long-term stability.

In the described device, after alignment in accordance with the adjustments noted above, the output lens 100 is solidly tightened with the element 401 through the chain of nodes and elements 100+200+401+screws (131-134, 211-214, 271-274, 291-294, shown in FIG. 7). The fiber tip 601 is solidly tightened to the element 402 through the set of elements 500+402+screws (461-464, 471-474), as also shown in FIG. 7. With the above adjustments, the fiber tip 601 is able to be fairly accurately positioned at point 000, however, even better accuracy is desired, Thus, in accordance with this fifth step in the alignment procedure, shown in FIG. 15, parallel displacement of the node 402 relative to the node 401 provides a very precise displacement of, for example ΔX, of the fiber tip 601 near the point 000. As noted above, the nodes 401 and 402 are connected with each other in a parallelogram configuration by means of flexible rods 431-434, so as to assure only parallel displacement is possible between nodes 401 and 402.

During the displacement of ΔX, the rods 431-434 "S"-bend so as to keep the shift of the node 402 parallel relative to the shift of the node 401.

The node 401 contains four solid legs 421-424 with slanting surfaces 421-S to 424-S, shown in FIG. 15, for precisely controlling the parallel displacement. More specifically, the node 402 contains four threaded holes 451-454 with screws 441-444 having a cone-like shape on top and slots for causing rotation of screws 441-444 using a screwdriver, such as W7 and W8 shown in FIG. 17. The slanted plane surfaces 421-S and 423-S of opposite legs 421 and 423 have an imaginary intersection with each other on a line $IL_{1-3}$ that extends perpendicular to the plane of the drawing, as shown at the bottom of FIG. 7D. The slanted plane surfaces 422-S and 424-S of opposite legs 422 and 424 have an imaginary crossing with each other on a line $-IL_{2-4}$ (not shown) which would be parallel to the plane of the drawing.

The illustrated shift ΔX (positive) of the node 402 to the right relative to the node 401 is accomplished by the simultaneous rotation of the screw 443 clockwise and of screw 441 counterclockwise, as shown in FIG. 15A. The slanting surface 423-S allows the screw 443 to pull the node 402 to the right (ΔX positive) owing to the upward "climbing" of screw 443. The counterclockwise rotation of screw 441 allows the node 402 to move to the right due to slanting of surface 421-S of leg 421. The shift of the node 402 to the left (ΔX negative) is accomplished by clockwise rotation of screw 441 and counterclockwise rotation of screw 443.

A ΔY shift of the node 402 relative to the node 401, that is, in a direction perpendicular to the plane of FIG. 15, is done in a similar manner as described above with respect to accomplishing a ΔX shift, however it is accomplished by the simultaneous rotation of the screws 442 and 444, Screw 444 (visible in FIG. 15B) and 442 slide over surfaces 424-S (visible in FIG. 15B) and 422-S of legs 424 and 422, respectively during such ΔX shift.

During the displacement of node 402 perpendicular to the plane of the drawing, the screws 441 and 443 slide over the surfaces 421-S and 423-S of legs 421 and 423. After the location 000 is found for tip 601, the screws 441-444 are tightened so as to provide a permanent locking of the X-Y position of the node 402 relative to the node 401, and hence the permanent positioning of fiber tip 601 relative to the point 000.

Compensation for Deviation of a Beam Emitted from a Fiber Tip having Angled Cleaving, an Additional Step in an Alignment Procedure for the Present Arrangement FIG. 16 shows how an embodiment of the present invention can compensate for the deviation of a beam emitted from a fiber 600 having angled cleaving at the fiber tip 601, by bending of the T-T-Z-node 200. The technique of inclined cleaving of a fiber tip is provided if polarization maintaining fibers are used or back reflection from the output surface of the fiber tip is to be minimized (in case of high laser power).

Figure 16A:
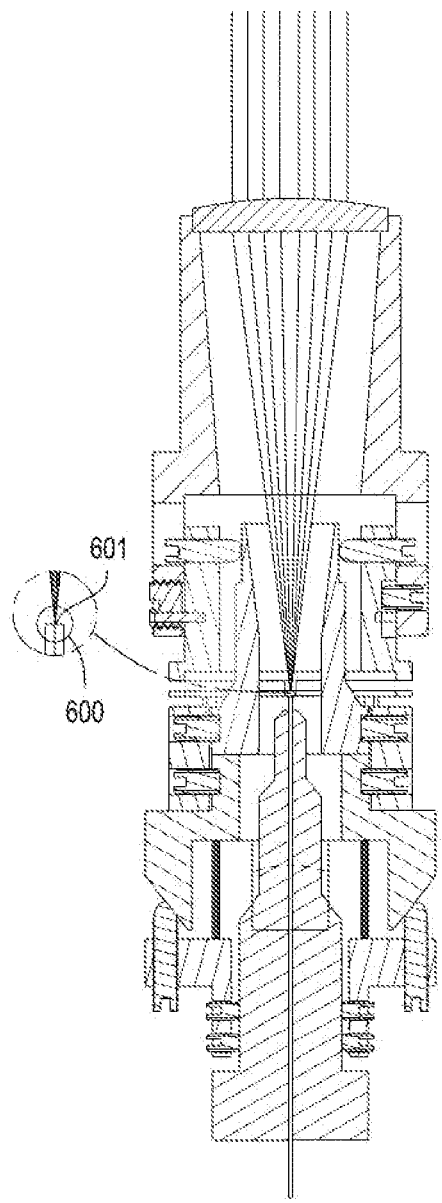
FIG. 16A illustrates a cross-section view of the assembly of the X-Y-Ω node portion to the T-T-Z node portion, which is tern is assembled with the lever and barrel node portions.
Figure 16B:
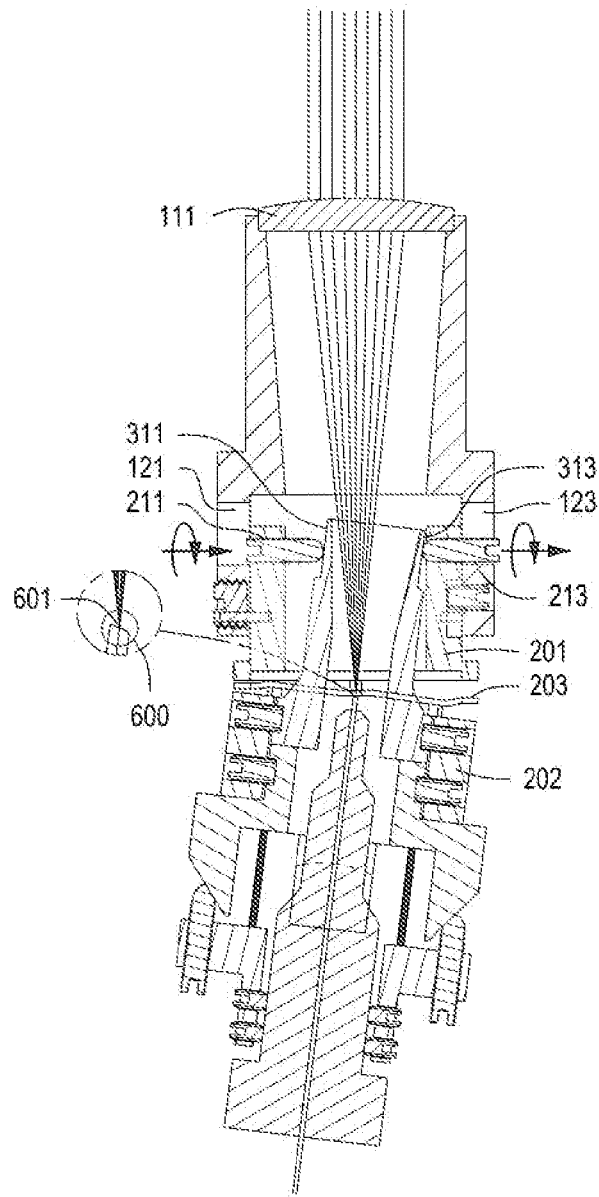
FIG. 16B illustrates bending of the T-T-Z-node so as to be adjustable for compensating deviation of the beam emitted from a fiber tip having an angled cleaving, in accordance with the exemplary embodiment of the invention shown in FIG. 7A.

FIG. 16A illustrates a beam centroid that is aligned in a correct position, where the fiber tip 601 has orthogonal cleaving. FIG. 16B illustrates a beam centroid that is aligned in a correct position, where the fiber tip 601 has angled cleaving of fiber tip 601. The bending geometry of the node 200 is used to compensate for the deviation of the beam emitted from the fiber tip 601 having angled cleaving.

Figure 17A:
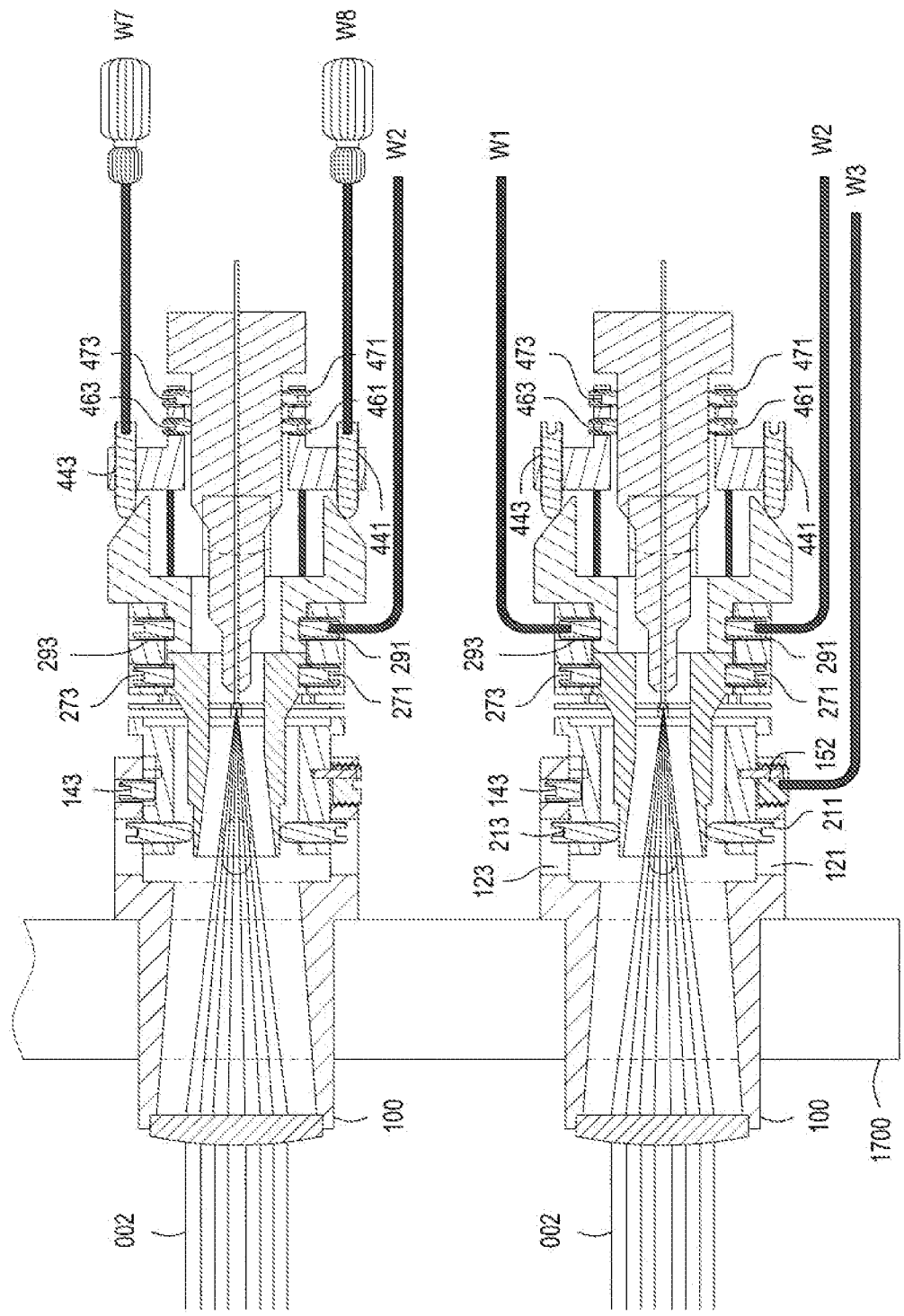
FIG. 17 (comprising FIGS. 17A, 17B and 17C) illustrates a mounting plate having secured thereto an array of collimators constructed in accordance with the exemplary embodiment of the invention shown in FIG. 7A, and being fully adjustable at their perimeters using the illustrated simple screwdriver devices for establishing a precise alignment among the array of collimators.
Figure 17B:
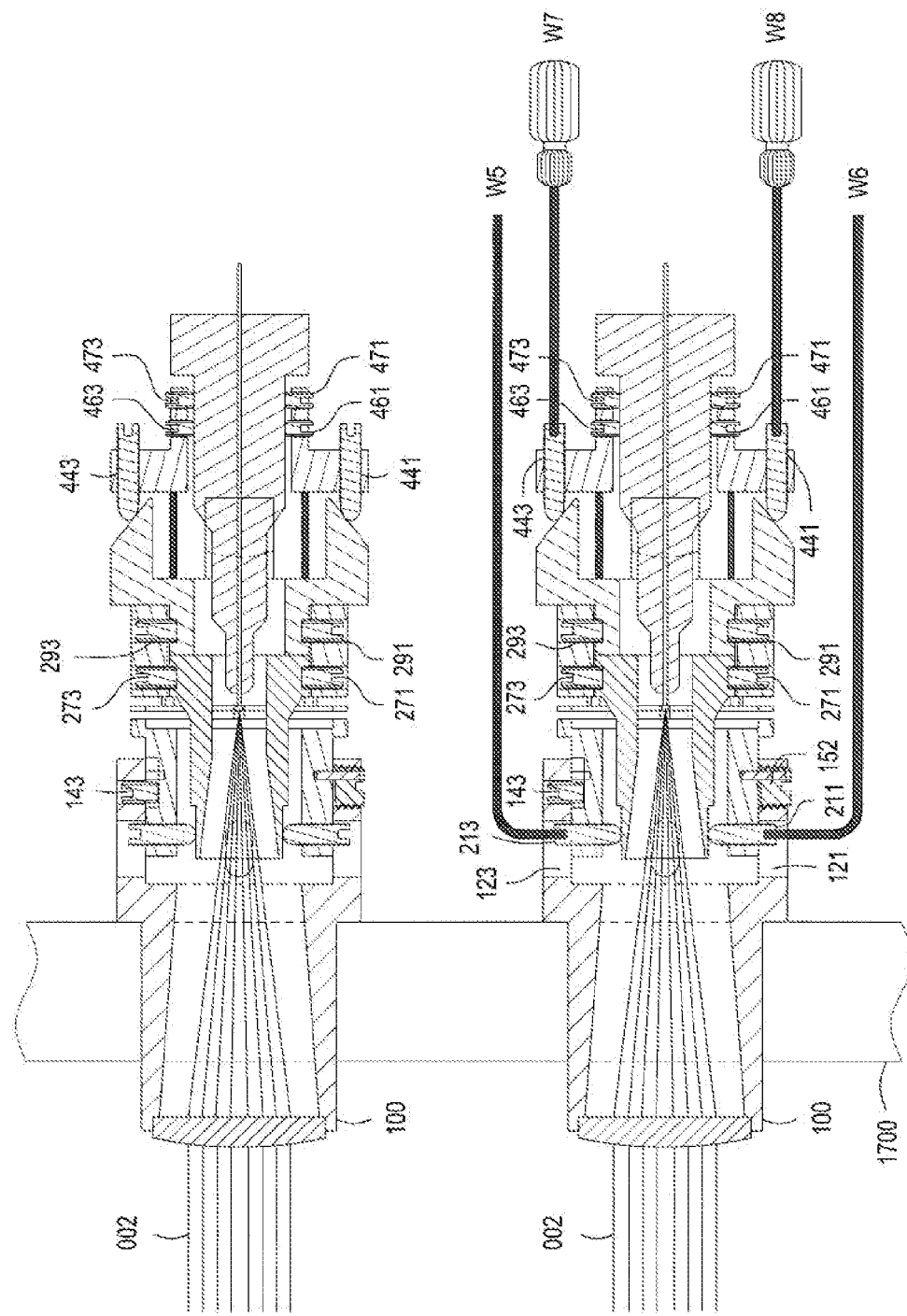
Figure 17C:
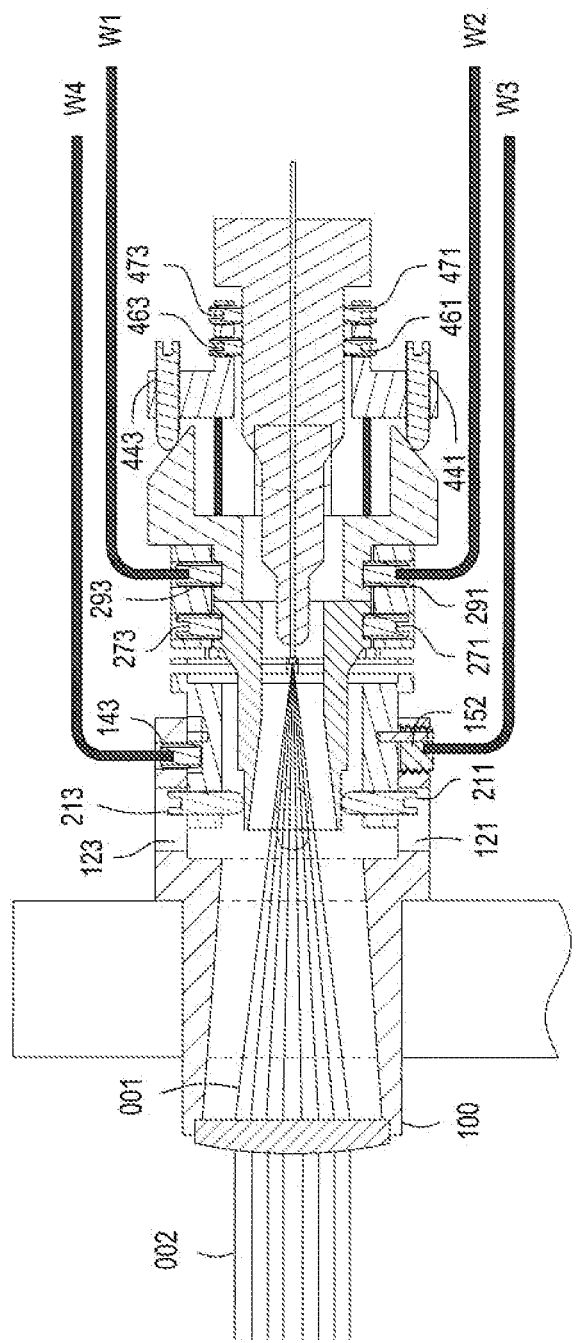

FIG. 17 (comprising FIGS. 17A, 17B and 17C) illustrates a mounting plate 1700 for securing thereto an array of collimators constructed in accordance with the exemplary embodiment of the invention shown in FIG. 7. In FIG. 17 an array of collimators is shown attached to a mounting plate 1700 that allows easy screwdriver access within a restricted space not much larger than the perimeter of each collimator, to all of the controlling screws used to establish precise control for all nine degrees of freedom of each mounted collimator. Adjusting screwdrivers W1-W8 are shown, where screwdrivers W1-W6 may comprise simple L-shape hexagon wrenches, and screwdrivers W7 and W8 used for the precision ΔX and ΔY alignment using screws 441-444, can be straight, and can also have a handle. Screwdriver W3 controls the ΔZ position of fiber tip 601, aligning the position of tip 601 with the focus point 000 of lenses 111, as described with respect to step four of the alignment procedure. Hex socket drivers (Allen wrenches) W4 are used to lock the adjusted ΔZ-position of tip 601, see also FIGS. 8 and 13. Hex screwdrivers W1 and W2 are used to lock the screws 291-294 after alignment of the polarization planes, as described with respect to step two of the alignment procedure.

Allen wrenches W5 and W6 control the screws 211-214 used for aligning the divergent beams 001 in the center of each output lenses 111 and then locking these screws after alignment, as described with respect to step three of the alignment procedure. Hex screwdrivers W7 and W8 provide for precision displacement of the fiber tip 601 in the X and V directions by means of rotation of screws 441-444, as described with respect to step five of the alignment procedure.

If necessary, two screwdrivers responsible for Y displacement of the same collimator can be kept attached to the corresponding pair of screws 442 and 444 until the XV alignment process of the selected collimator is complete. The final location of fiber tip 601 can be locked at any position by tightening the opposite screws (e.g. 441 and 443).

Figure 18A:
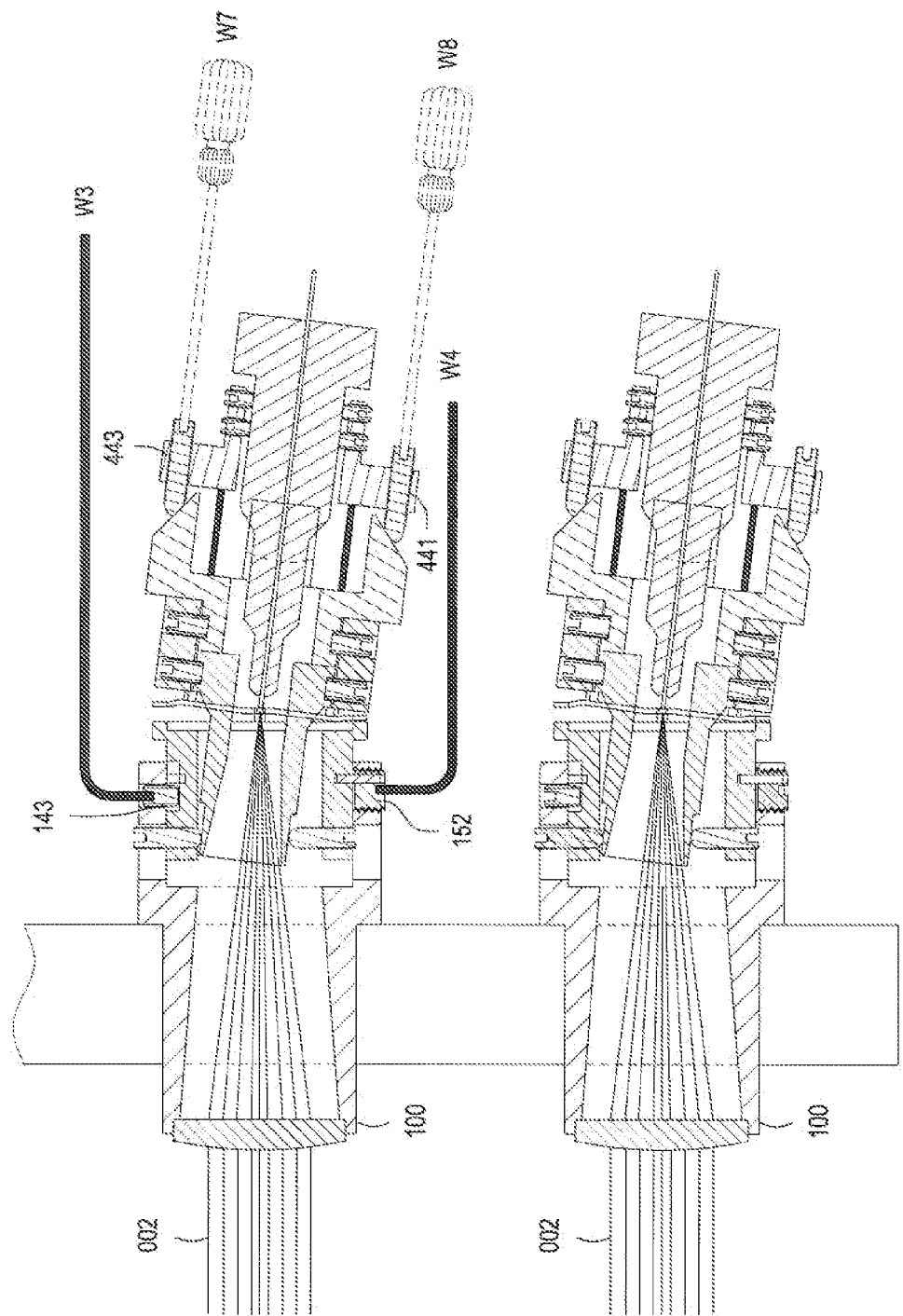
FIG. 18 (comprising FIGS. 18A, 18B and 18C) illustrates an array of collimators arranged in accordance with the exemplary embodiment of the invention shown in FIG. 17, having angled cleaving of the fiber tips which is compensated for using the illustrated simple screwdriver devices.
Figure 18B:
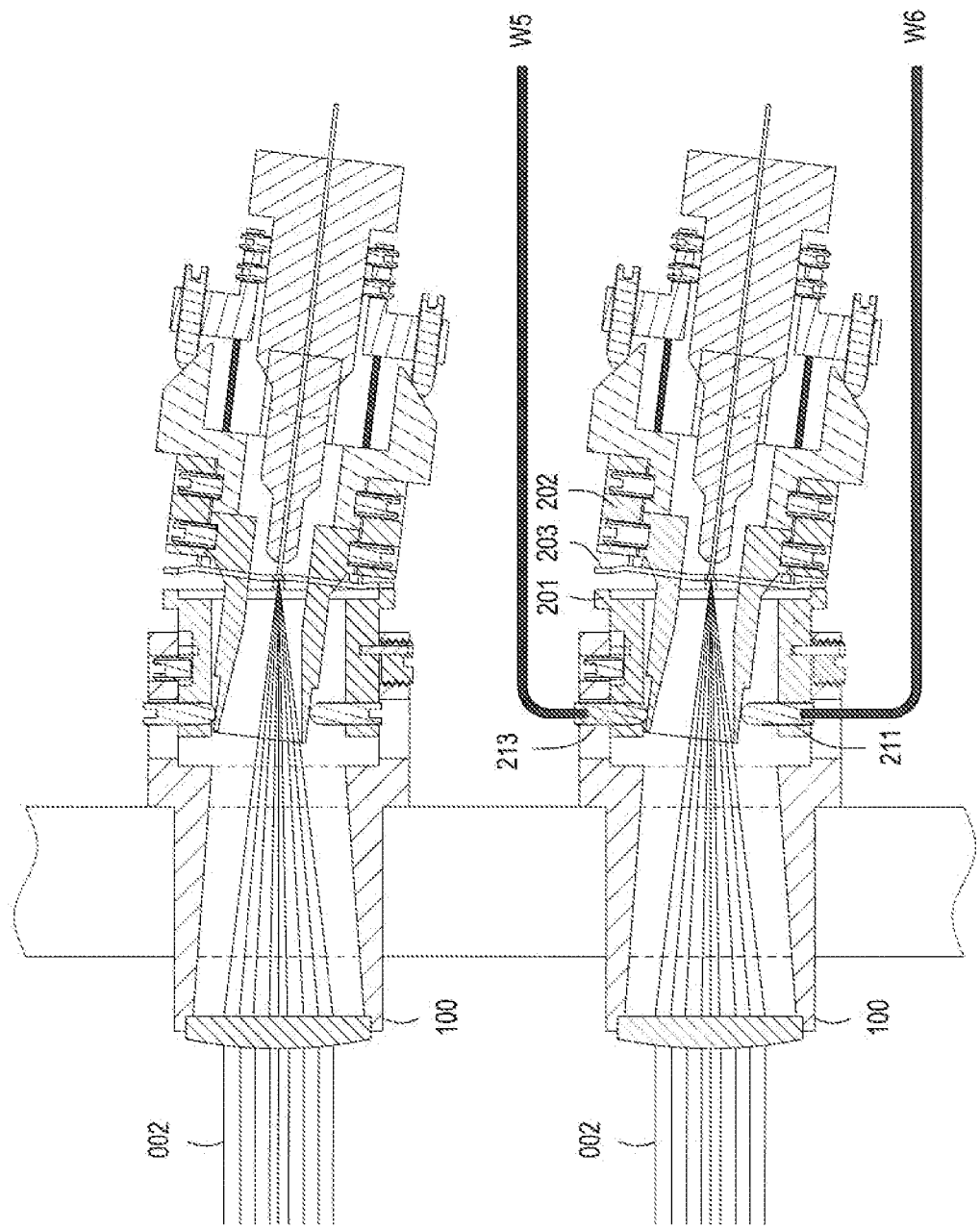
Figure 18C:
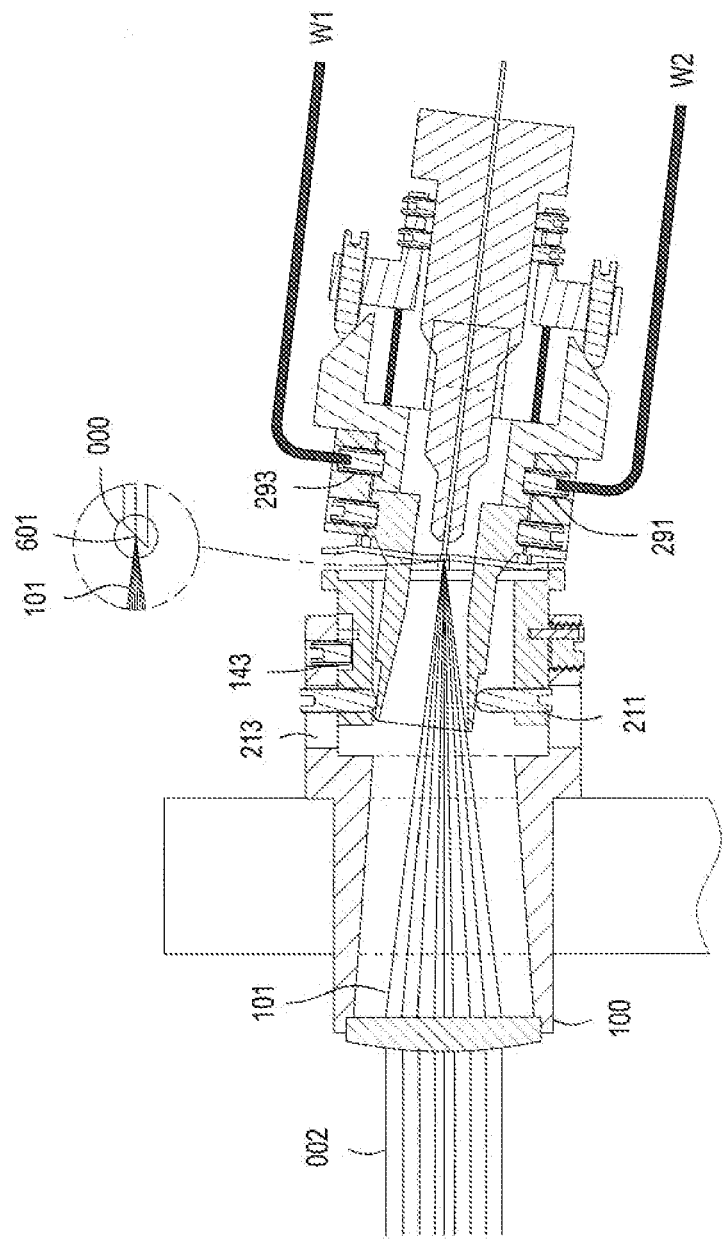

Alignment of an Array of Collimators having Angled Cleaving at the Output of their Fiber Tips FIG. 18 (comprising FIGS. 18A, 18B and 18C) illustrates an array of collimators having angled cleaving at the output of their fiber tips. Strong deviations of the output diverging beams 101 from the Z-axes may occur as a result of inclined cleaving of fiber tip 601.

The optic um alignment of beam centroids to the apertures of the lenses can be accomplished with hex screwdrivers W5 and W6 which, as shown in FIG. 18B turn the screws 211-214 and provide the necessary tip/tilt compensation of the beam deviations in a manner similar to that described with respect to step three of the alignment procedure. It is also seen that the illustrated embodiment provides easy access using hex or socket screwdrivers to other screws used for aligning the necessary degrees of freedom in a densely packed array as described above, when using collimators constructed in accordance with embodiments of the present invention.

Although the lens is required to be a fixed distance from the reference point 000, it is not required that the fixed distance result in the lens being positioned exactly at the top end of barrel 100 as in the above described embodiments, in order to utilize the adjustment mechanism of the invention, and thus in an alternative embodiment the lens can be located a fixed distance therefrom.

Accordingly, FIG. 19 illustrates a modular design for an array of collimators having an alternative construction to the collimators shown in FIG. 17, where here a collimator holder (also called a unified platform) 010, is used to decouple the collimator lenses 111 from direct attachment at the output of each collimator in the array.

An arrangement accordance with this alternative embodiment is useful when a large number of collimators are to be densely packed in an array, and the body containing the collimators can itself be too large, bulky and heavy for all of the collimators to be mounted in the array. The fill factor of output lenses, roughly proportional to the ratio of the lens aperture 003 to the distance 004 between the centers of neighbor lenses, can significantly restrict the requirements for the dimensions of part 110 of the barrel 100 in order to provide the stiff, reliable and precise attachment of collimators to the body 1700 of the array, and thus lead to use of this alternative embodiment of FIG. 19.

Accordingly, the modular design of FIG. 19 is provided where the lenses 111 of each collimator are separated from their barrels 100 and placed on a unified platform 010 so as to form a lens holder node 011. The collimators are attached to their own holder 010 (or body 010) using, for example, simple holes in holder 010 to accommodate the lens-free part 110 of barrels 100. In this case the fill factor for output sub-apertures is not restricted by the dimension of part 110 occupying the periphery areas of Gaussian beams 001. Accordingly, a lens holder 011 in this alternative embodiment is shown attached to the body 010 by means of thick rods 020 position outside of the lens area, thereby providing a stiff and reliable alignment of the lenses 111 relative to the body 010 with attached collimators. The alignment accuracy of body 010 and lens holder 011 is of modest requirements because the final alignment of fiber tips 601 in the focuses 000 of lenses 111 can be accomplished by means of the above-described collimator adjustments having nine degrees of freedom.

The free space between lens holder 011 and body 010 in the modular design also allows one to embed sensors used for power and/or polarization sensing of beams 001 for computerized feedback control of beam parameters, as well as to embed a means intercepting and dissipating parasitic portions of laser beam power.

The foregoing description, for purpose of explanation, has been described with reference to specific embodiments. However, the illustrative discussions above are not intended to be exhaustive or to limit the invention to the precise forms disclosed, Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. An apparatus for controlling the position of a light beam relative to a lens, comprising:
   an elongate hollow output node having an upper portion and a bottom portion for passing a light beam therethrough, the upper portion providing the light beam along a longitudinal axis of the output node towards a lens; and
   an elongate hollow base node having separate top and bottom parts connected to each other along a longitudinal axis of the base node by opposed ends of a plurality of flexible rods that restrict the relative movement between the top and bottom parts of the base node to substantially only translational parallel movement, the top part of the base node being coupled to the bottom portion of the output node and the bottom part of the base node being coupled to receive therein the light beam;
   wherein for adjusting the translational parallel movement between the top and bottom parts of the base node, opposed portions of the bottom part of the base node each include a respective screw that adjustably extends in a direction parallel to the longitudinal axis of the base node, and opposed portions of the top part of the base node each include a respective slanted surface that opposes a screw in a correspondingly positioned opposed portion of the bottom part of the base node, so that extension of one screw in the bottom part of the base node in combination with retraction of another screw in the bottom part of the base node, establishes a shearing force that results in precisely controlled translational parallel relative movement between the top and bottom parts of the base node.

2. The apparatus of claim 1, wherein the opposed portions of each of the top and bottom parts of the base node comprise two pairs of opposed portions, each pair being positioned on one of two axes that are each orthogonal to the longitudinal axis of the base node.

3. The apparatus of claim 1, wherein the top part of the base node includes a circular groove around a perimeter thereof for allowing adjustable rotational relative movement between the output node and the base node.

4. The apparatus of claim 1, wherein the bottom part of the base node is adapted to receive therein a fiber node that provides the light beam at an emitting tip thereof.

5. The apparatus of claim 4, wherein the bottom part of the base node includes about a periphery thereof two sets of first and second pairs of orthogonally positioned adjustment screws, each pair of adjustment screws being positioned on one of two axes that are both orthogonal to the longitudinal axis of the base node, the two sets of pairs of adjustment screws being spatially separated from each other along the longitudinal axis of the node so that upon appropriate tightening and loosing of the first and second pairs of adjustment screws of each set, a tilt adjustment can be made to the position of a longitudinal axis of the fiber node relative to the longitudinal axis of the base node.

6. The apparatus of claim 1, further including an elongate hollow intermediate node having top and bottom parts connected to each other along a common longitudinal axis by a flexible coupling, the top part of the intermediate node being dimensioned to be positionable inside the bottom portion of the output node and the bottom part of the intermediate node being dimensioned to receive the top part of the base node, thereby providing the coupling of the base node to the output node.

7. The apparatus of claim 6, wherein flexing of the flexible coupling causes an angular tilt in the common longitudinal axis of the intermediate node at the location of the flexible coupling.

8. The apparatus of claim 6, further including a lever node having a bottom part connected to the bottom part of the intermediate node, and a top part dimensioned to be positionable inside the top part of the intermediate node.

9. The apparatus of claim 8, wherein the top part of the intermediate node includes about a periphery thereof first and second pairs of orthogonally positioned adjustment screws, each pair of adjustment screws being positioned on one of two axes that are orthogonal to the longitudinal axis of the intermediate node, so that upon appropriate tightening and loosing of the adjustment screws of a respective one of the first and second pairs of adjustment screws, contact between the screws and the top part of the lever node cause a tilt adjustment to the position of a longitudinal axis of the fiber node relative to the longitudinal axis of the output node.

\* \* \* \* \*